United States Patent
Person et al.

(10) Patent No.: US 11,463,789 B2
(45) Date of Patent: Oct. 4, 2022

(54) INTERACTIVE MULTIMEDIA STRUCTURE

(71) Applicant: HARVES GROUP, LLC, Washington, DC (US)

(72) Inventors: Francis Person, Washington, DC (US); Jonathan C. Pavony, Washington, DC (US)

(73) Assignee: HARVES GROUP, LLC, Washington, DC (US)

( * ) Notice: Subject to any disclaimer, the term of this patent is extended or adjusted under 35 U.S.C. 154(b) by 0 days.

(21) Appl. No.: 17/115,206

(22) Filed: Dec. 8, 2020

(65) Prior Publication Data
US 2021/0337283 A1 Oct. 28, 2021

Related U.S. Application Data

(60) Provisional application No. 63/014,570, filed on Apr. 23, 2020.

(51) Int. Cl.
| | |
|---|---|
| *H04N 21/845* | (2011.01) |
| *H04N 21/8545* | (2011.01) |
| *G06N 20/00* | (2019.01) |
| *G06F 16/40* | (2019.01) |

(52) U.S. Cl.
CPC ......... *H04N 21/8545* (2013.01); *G06F 16/40* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 10,668,391 B1 * | 6/2020 | Krauthamer | A63G 25/00 |
| 10,937,239 B2 * | 3/2021 | Huston | A63F 13/00 |
| 2009/0221374 A1 * | 9/2009 | Yen | A63F 13/428 |
| | | | 463/42 |
| 2018/0292886 A1 * | 10/2018 | Chataignier | G09G 3/003 |
| 2019/0240568 A1 * | 8/2019 | Routhier | A63F 13/213 |

(Continued)

OTHER PUBLICATIONS

"Falcon's Creative Group Unveils GameSuite (tm) Product for Entertainment Venues," Falcon's Creative Group, PRNewswire, Orlando, Florida, Nov. 12, 2020. https://www.prnewswire.com/news-releases/falcons-creative-group-unveils-gamesuite-product-for-entertainment-venues-301172138.html.

(Continued)

*Primary Examiner* — Cai Y Chen
(74) *Attorney, Agent, or Firm* — Squire Patton Boggs (US) LLP

(57) ABSTRACT

Systems, methods, apparatuses, and computer program products for an interactive multimedia structure. For example, the interactive multimedia structure may include a plurality of walls on a majority of which an immersive environment is displayed. A user may interact with the immersive environment through manipulation of a user input device, which may be tracked by one or more systems associated with the interactive media structure. Based on the manipulation, the one or more systems may modify the immersive environment displayed on the majority of the walls. In certain embodiments, the one or more systems may process interaction information of the user with the one or more user input devices to adaptively and intelligently modify the immersive environment.

28 Claims, 34 Drawing Sheets

(56) References Cited

U.S. PATENT DOCUMENTS

2020/0327531 A1* 10/2020 Rogers ............... G06Q 20/3276
2021/0069574 A1*  3/2021 O'Dowd ................ A63B 69/00

OTHER PUBLICATIONS

Video Game—Wikipedia, 23 pages, Nov. 9, 2020, https://en.wikipedia.org/wik/Video_game#Game_media.

Yap Wan Xiang, "South Korea Now Has an AI-Powered News Anchor That is Capble of Working 27/7," says.com, Nov. 13, 2020. https://says.com/my/tech/south-korea-mbn-now-has-an-ai-news-anchor-kim-ju-ha-capable-of-working-24-7.

GameSuite (tm) | Immersive Gaming Attraction | Falcon's Creative Group, Playsystem—website. https://falconscreativegroup.com/gamesuite/.

GameSuite (tm) Brochure, Technologies, Falcon's Licensing. https://falconscreativegroup.com/gamesuite/.

International Search Report and Written Opinion dated May 12, 2021 corresponding to International Patent Application No. PCT/US2021/028530.

\* cited by examiner

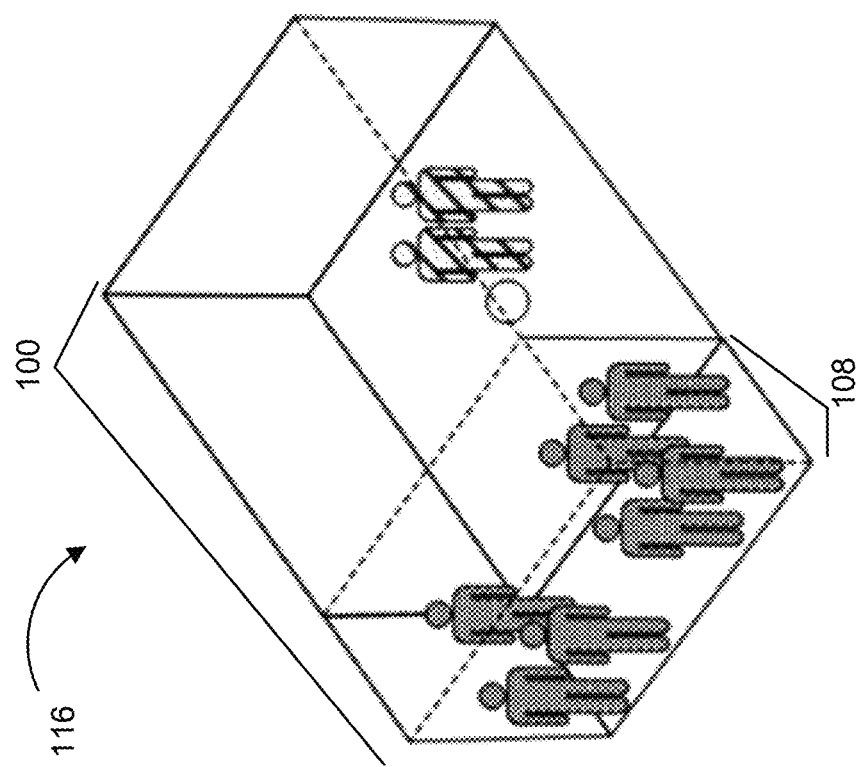
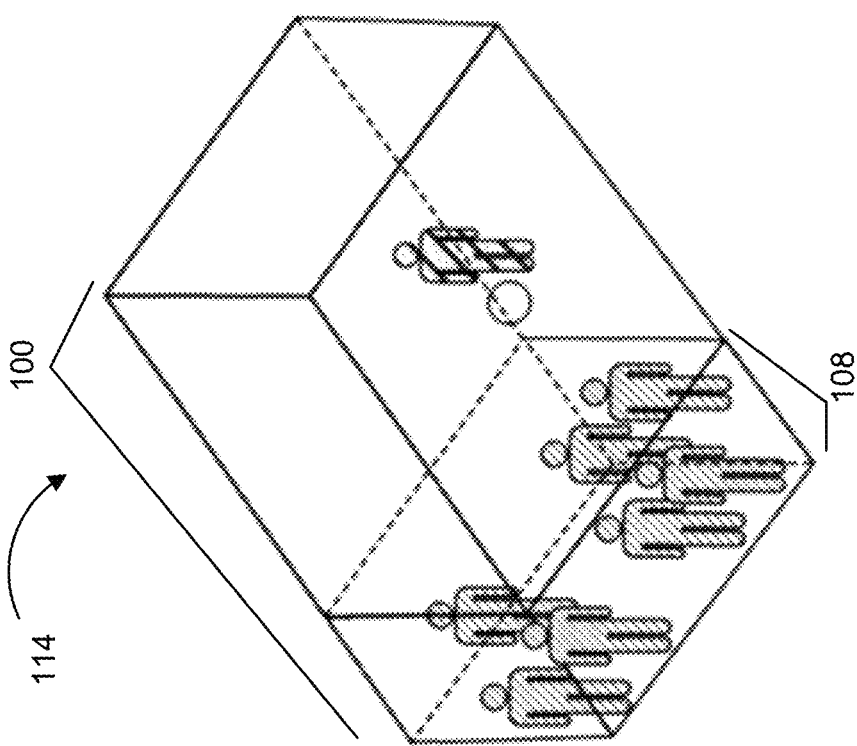
Fig. 1f

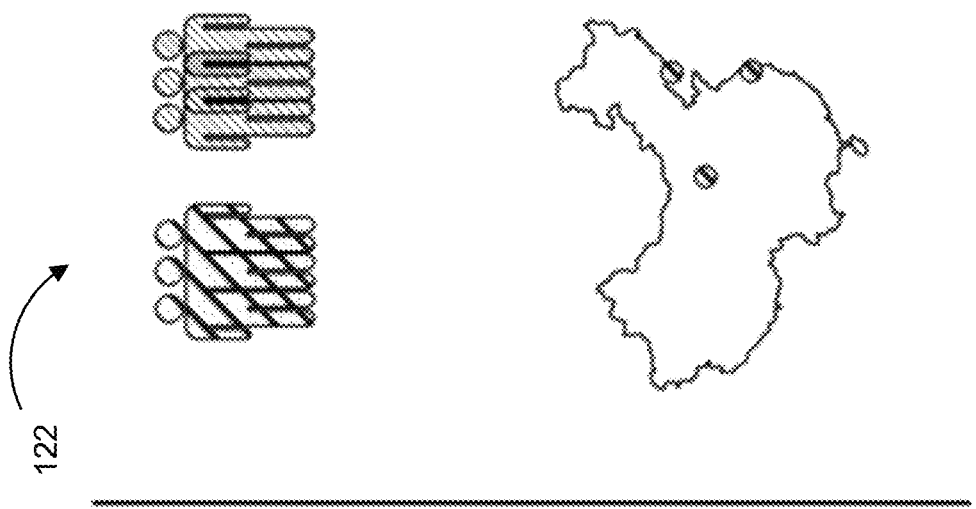
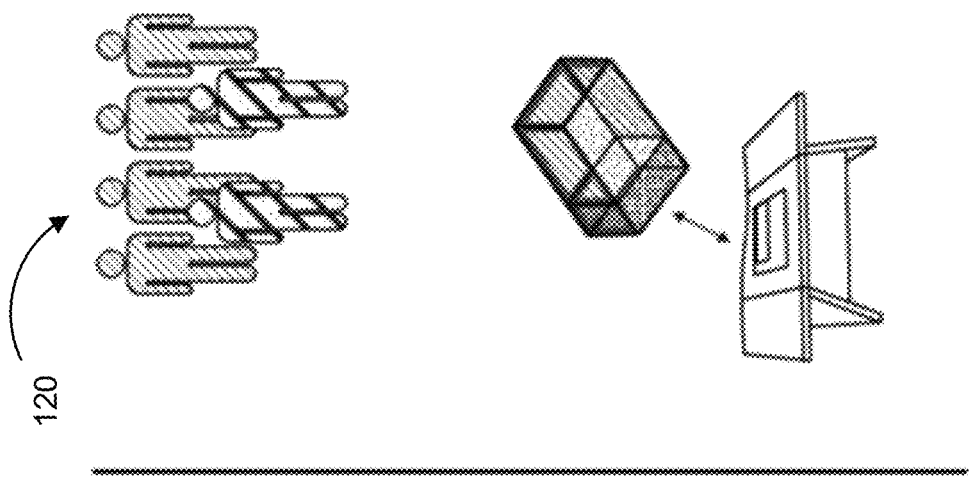
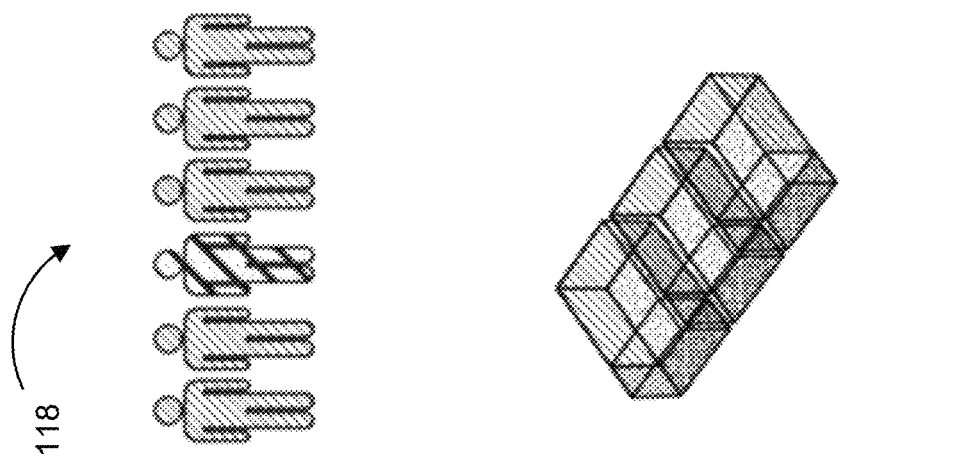
Fig. 1g

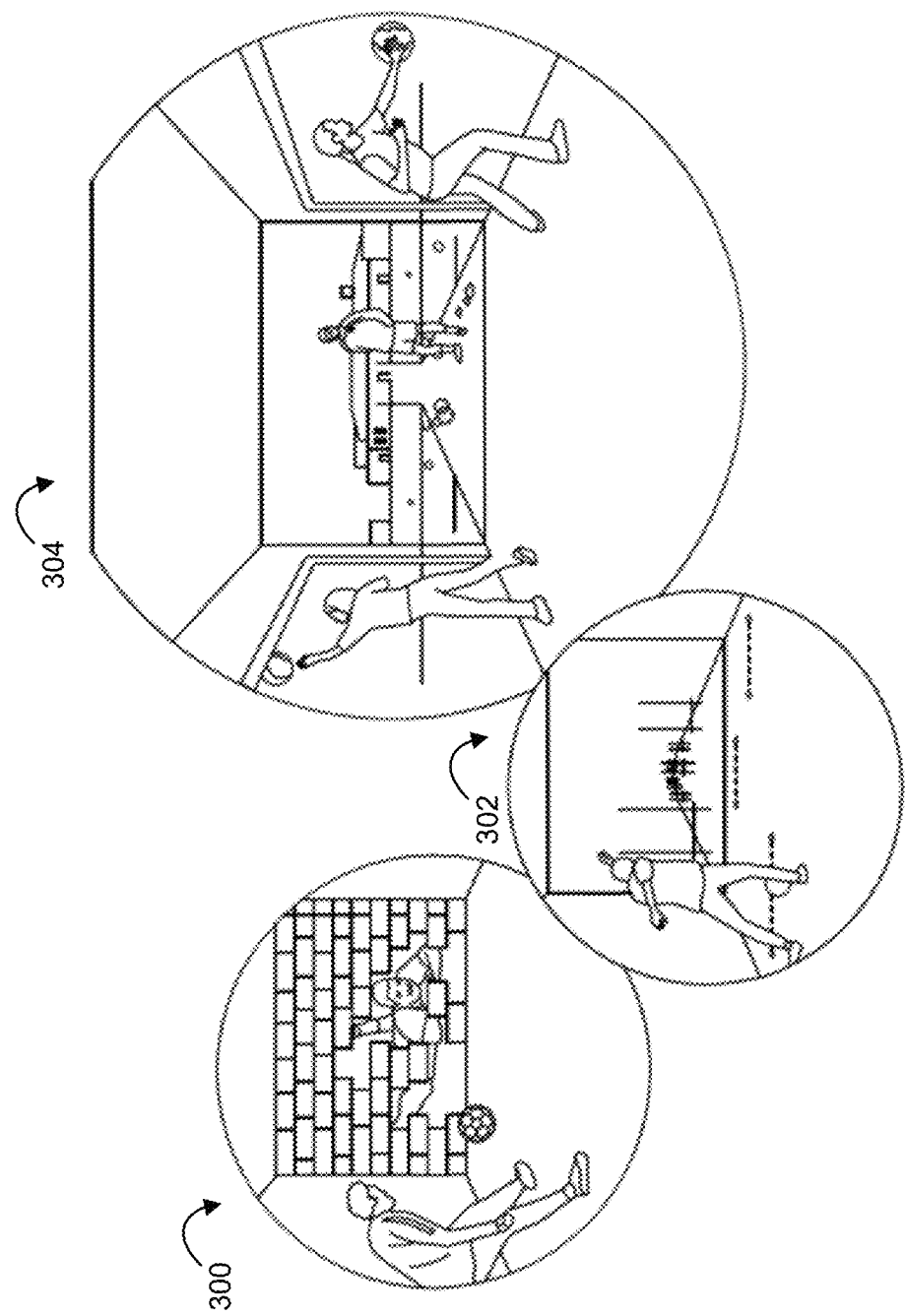

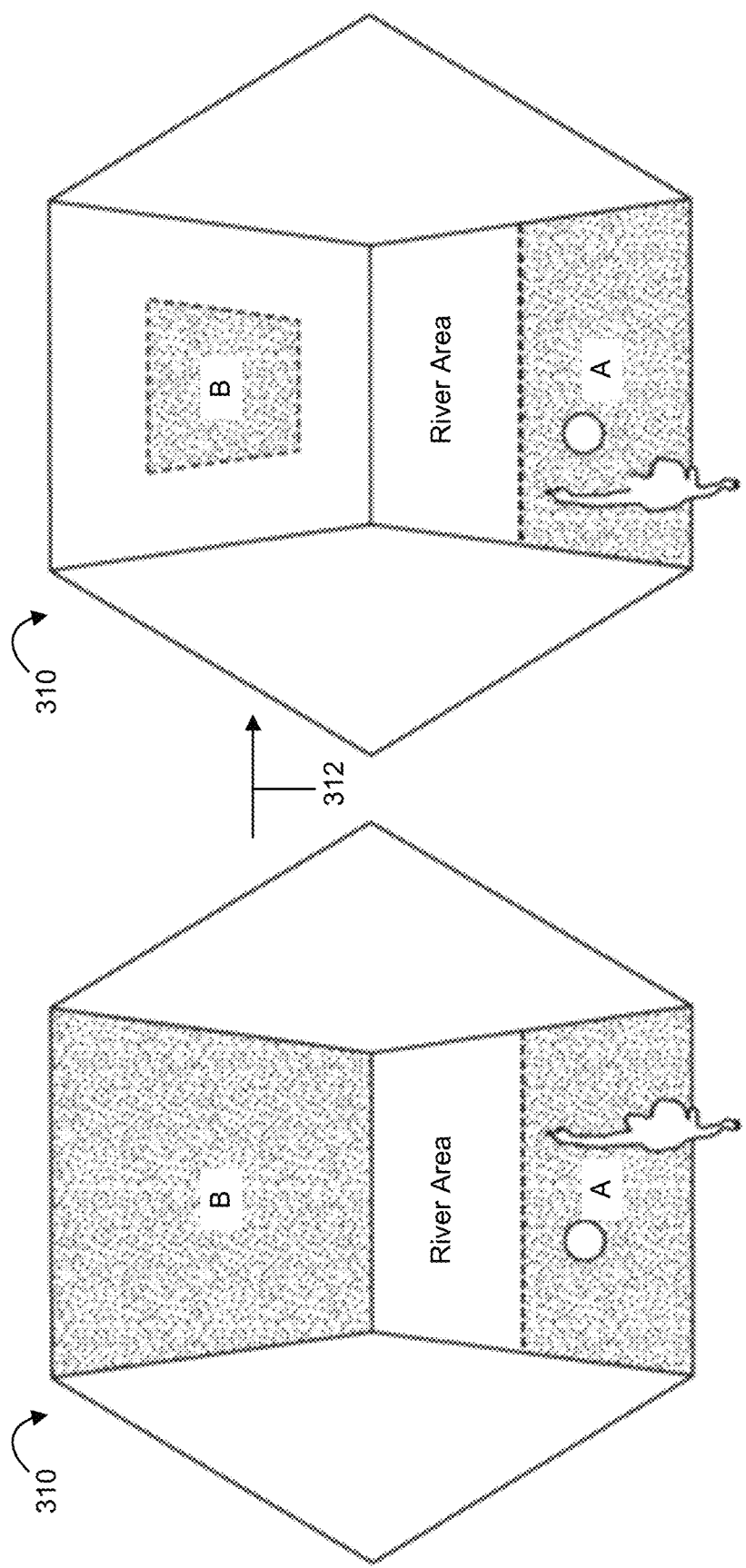

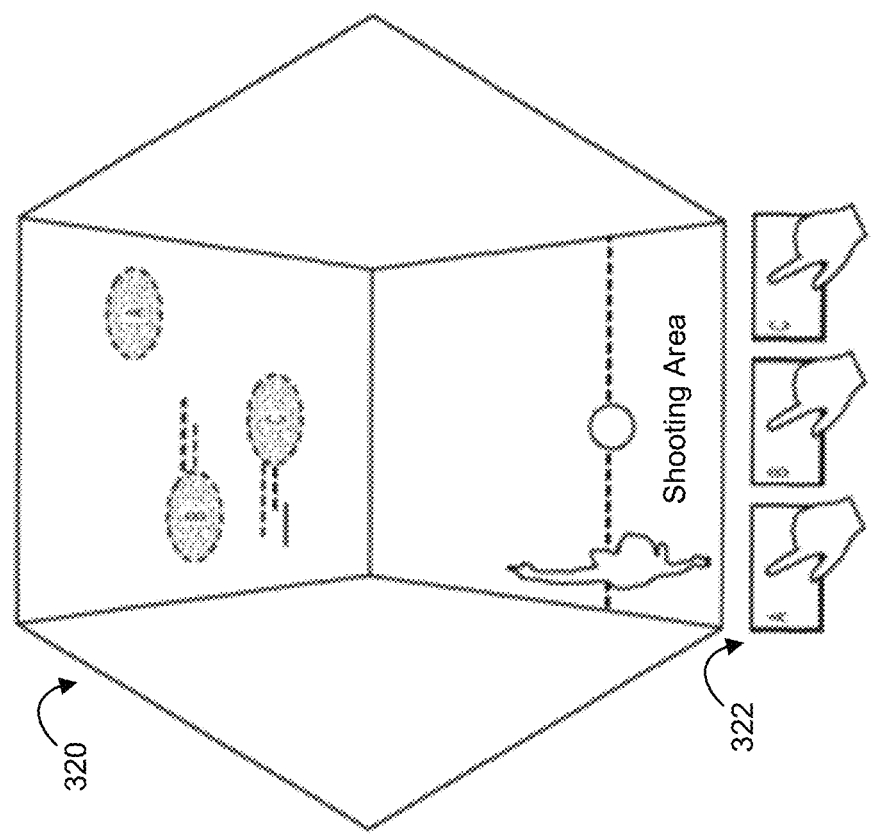
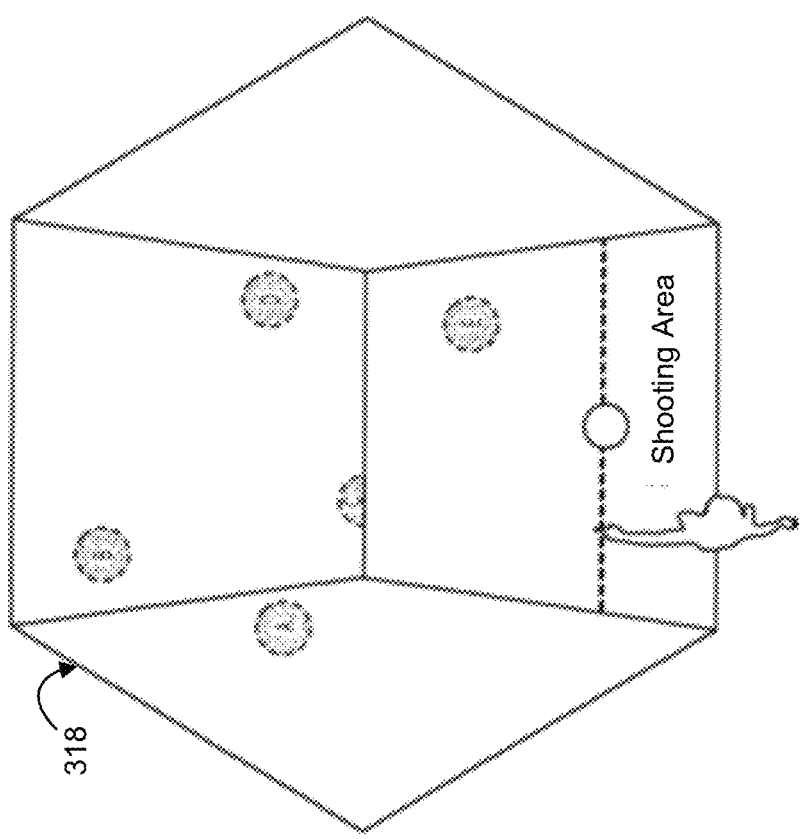
Fig. 3e

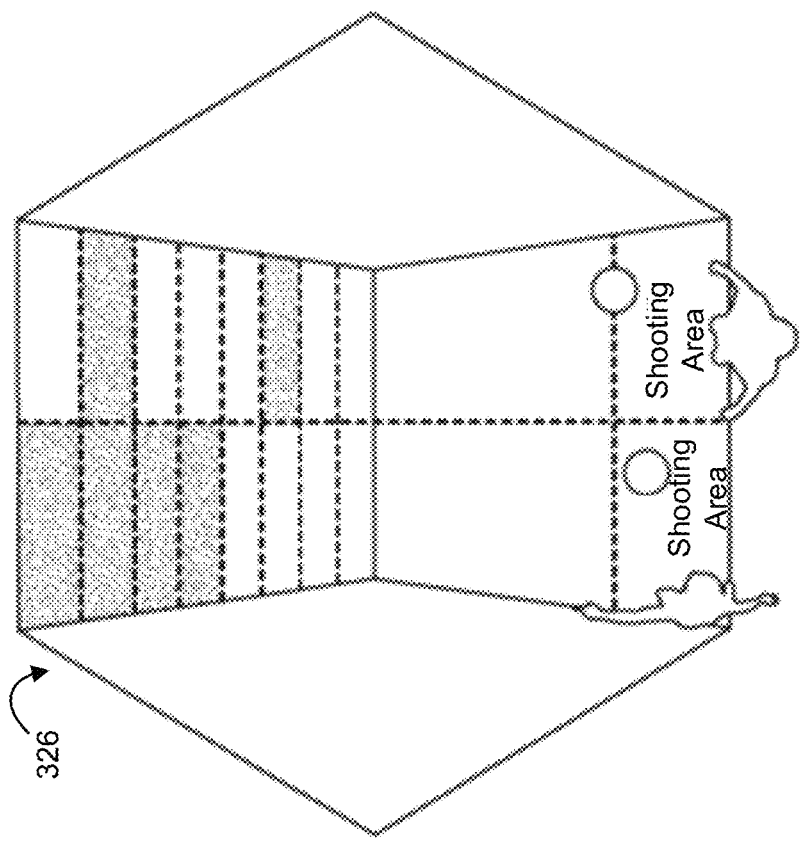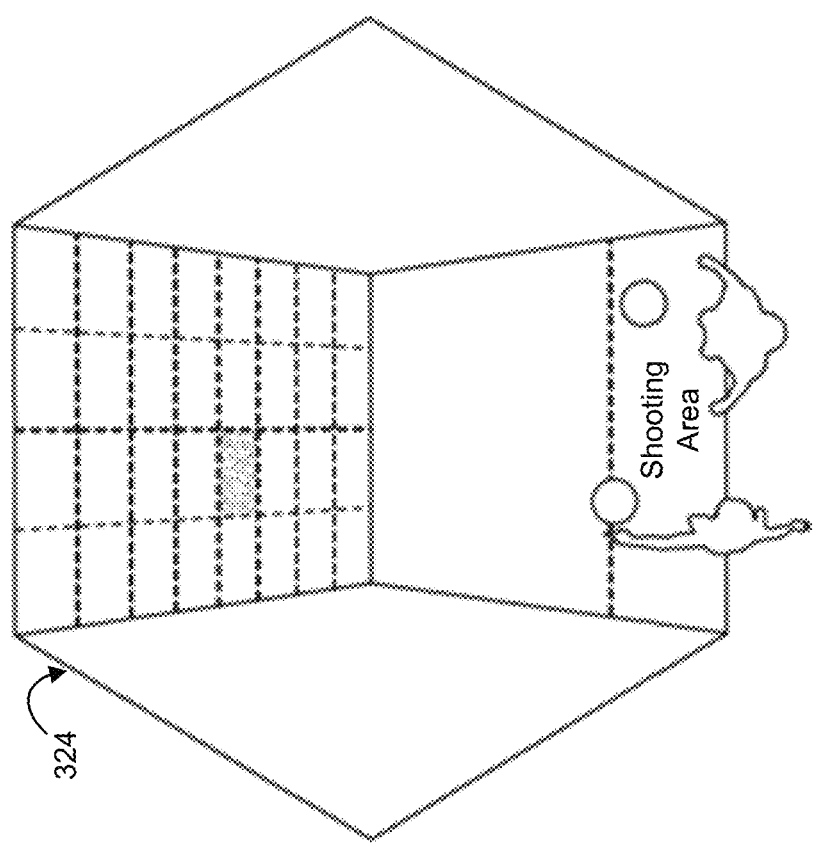
Fig. 3f

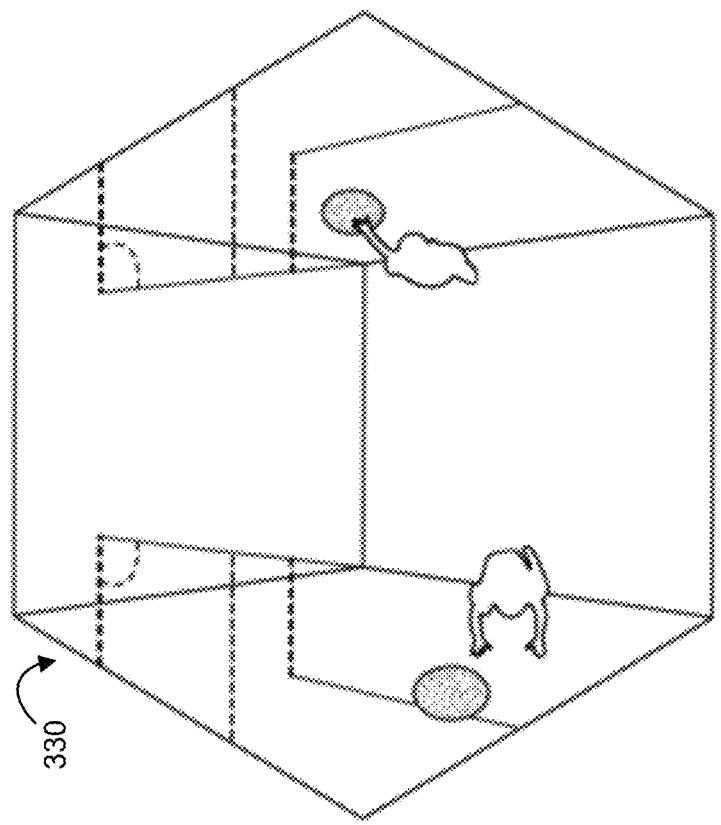
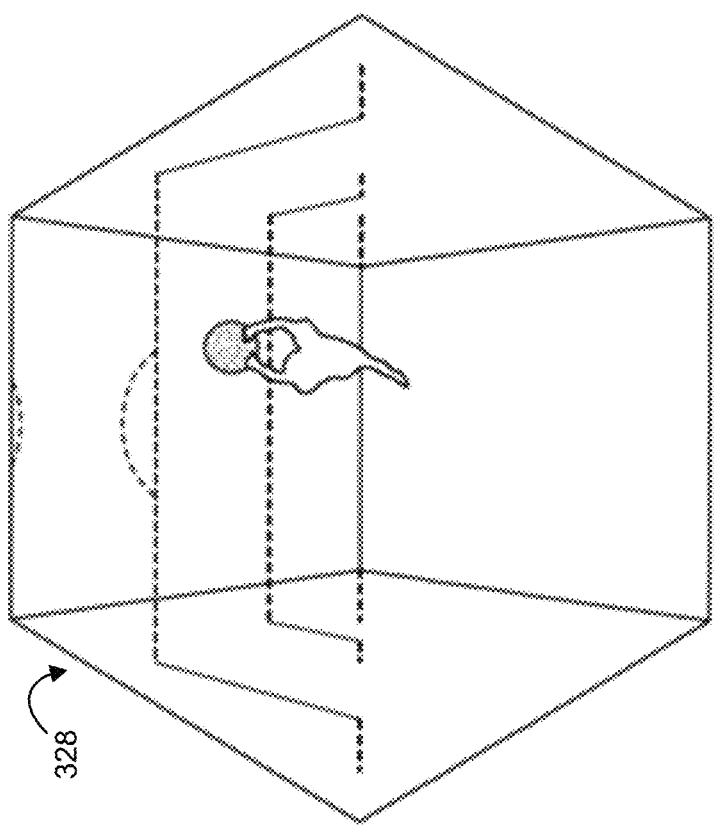
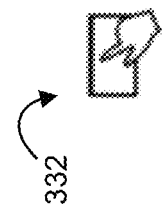
Fig. 3g

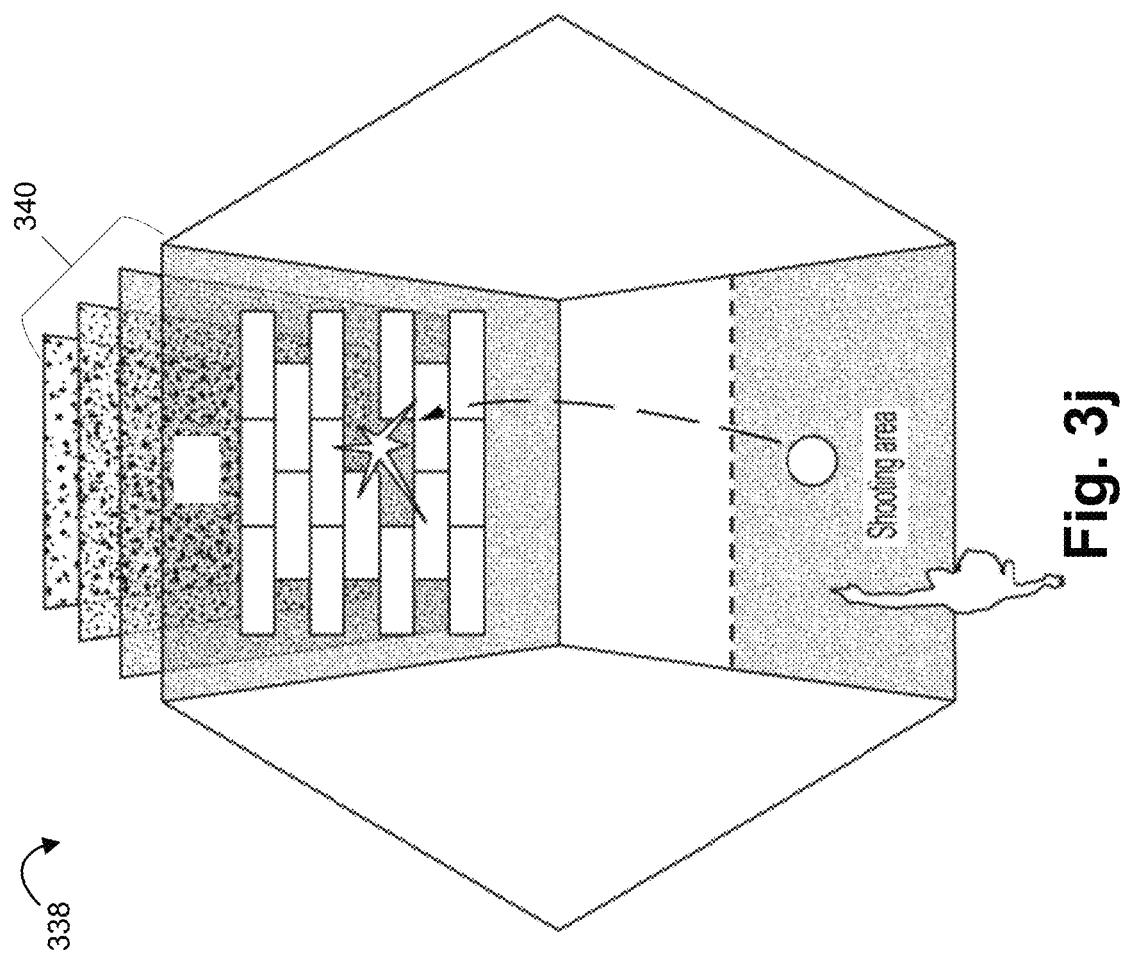

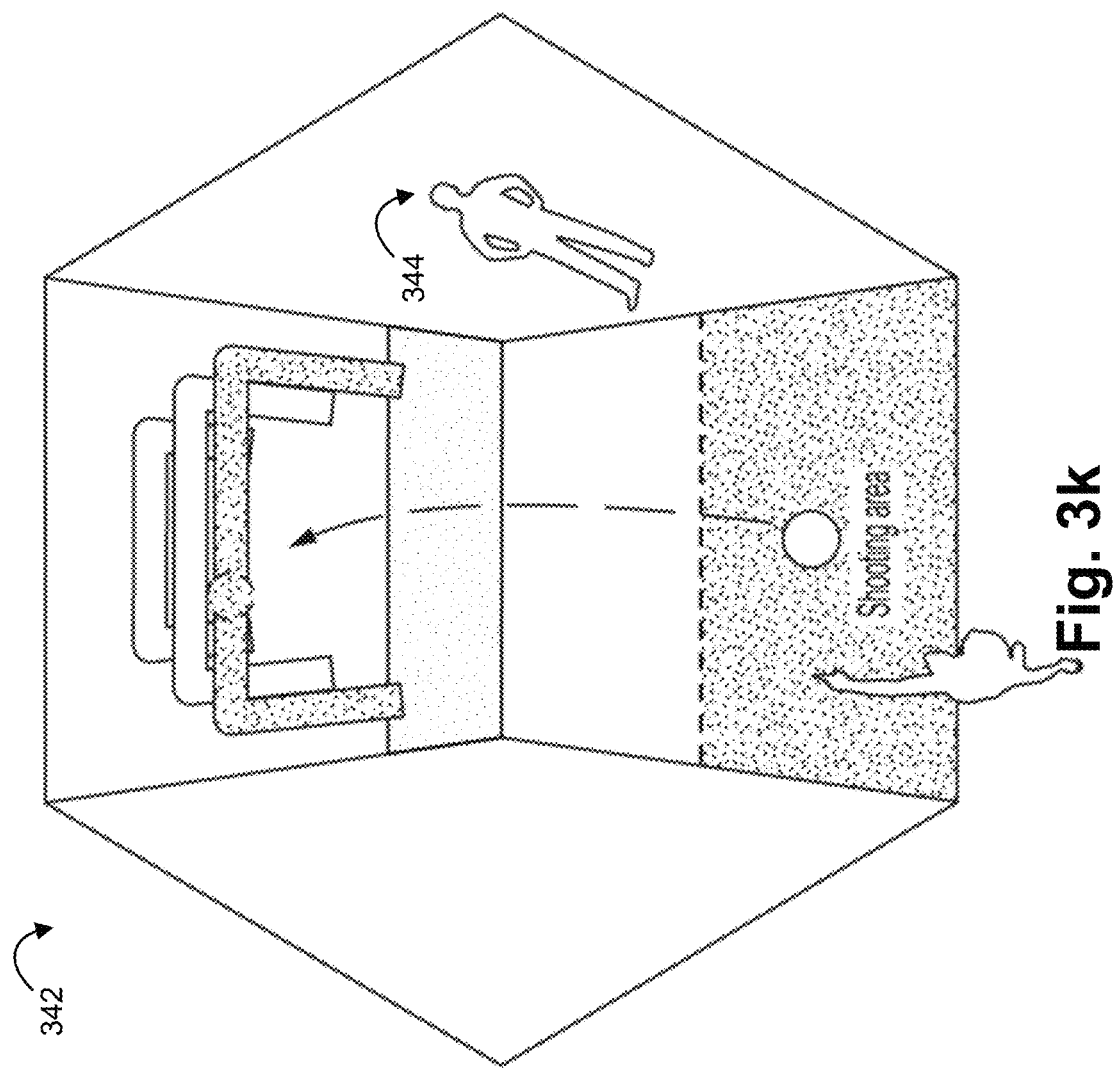

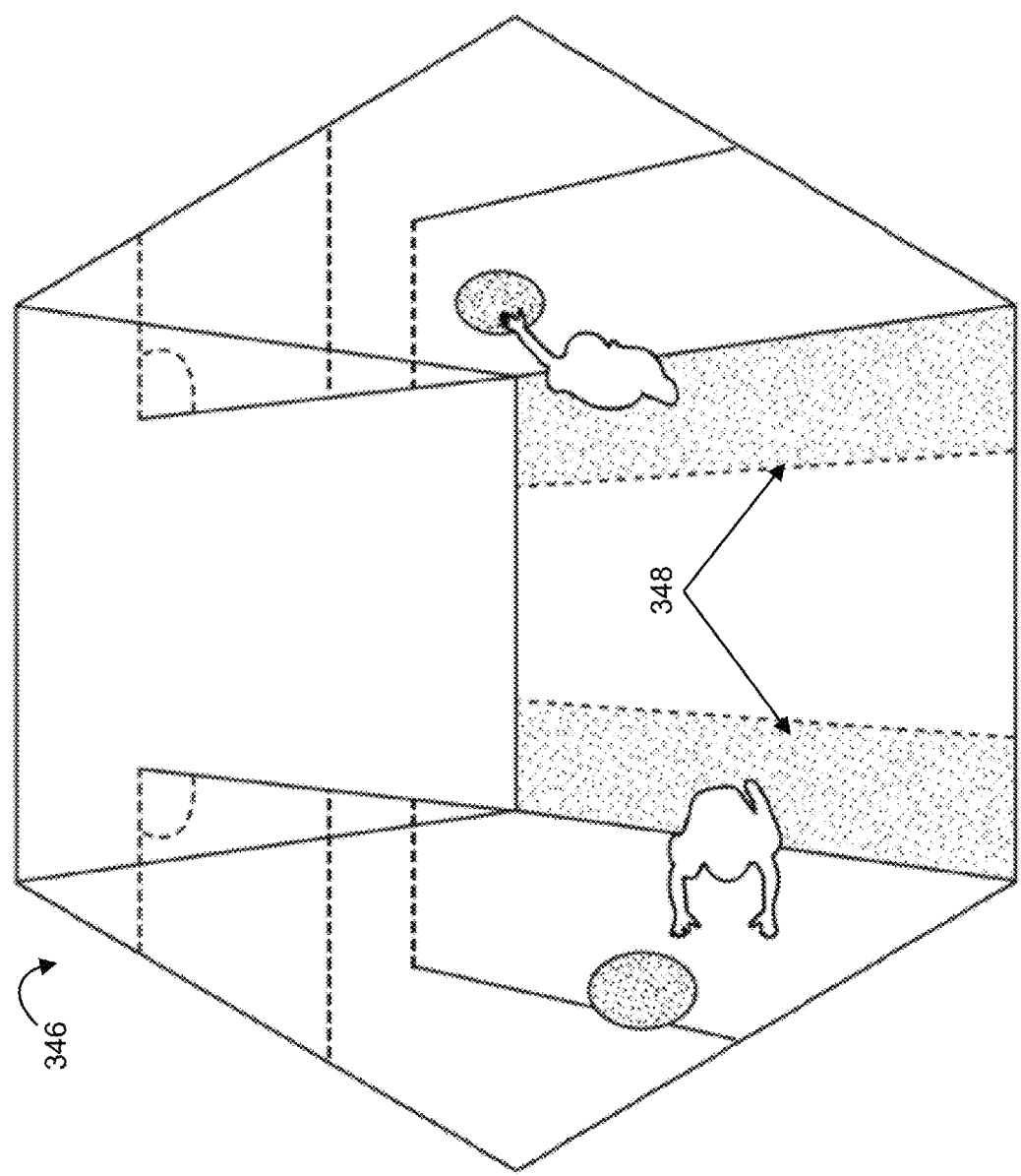

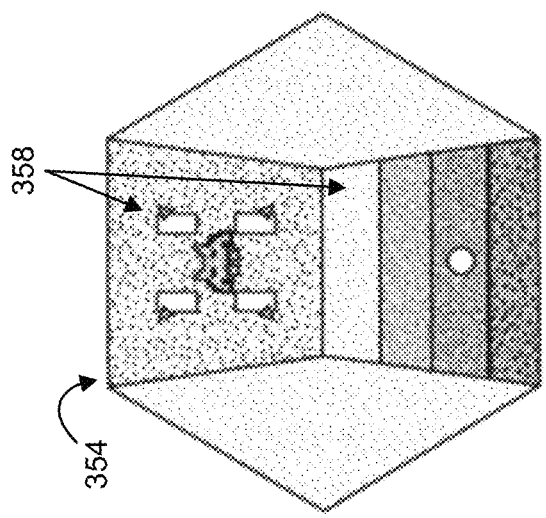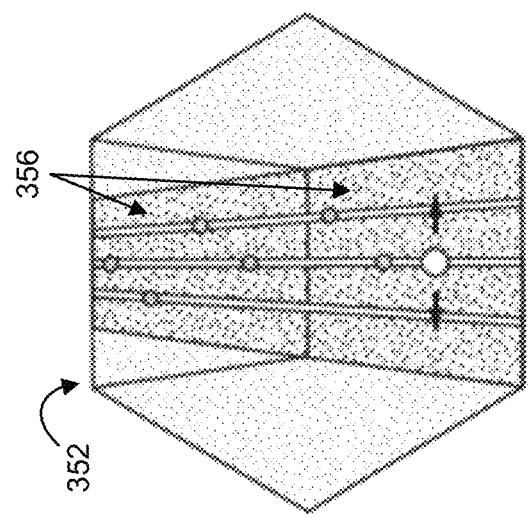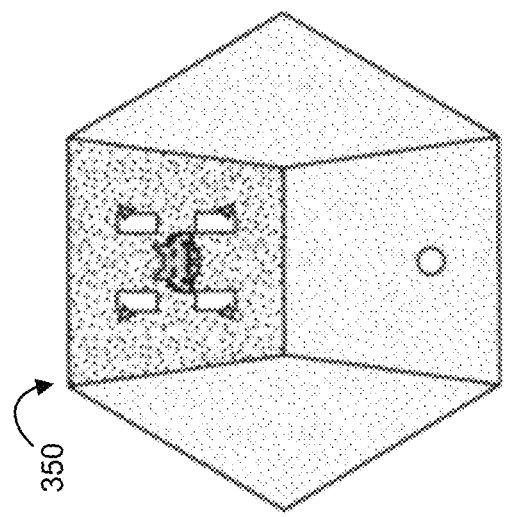
Fig. 3m

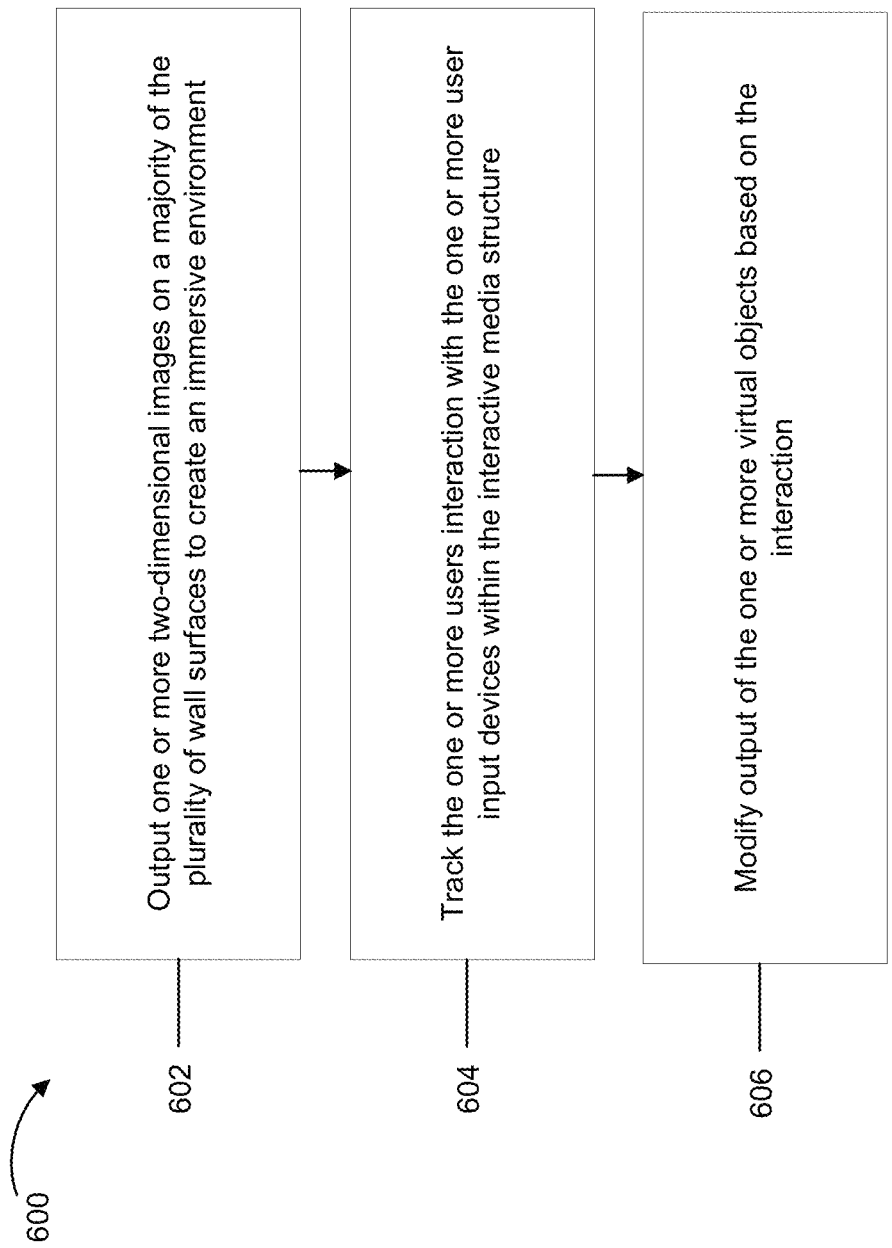

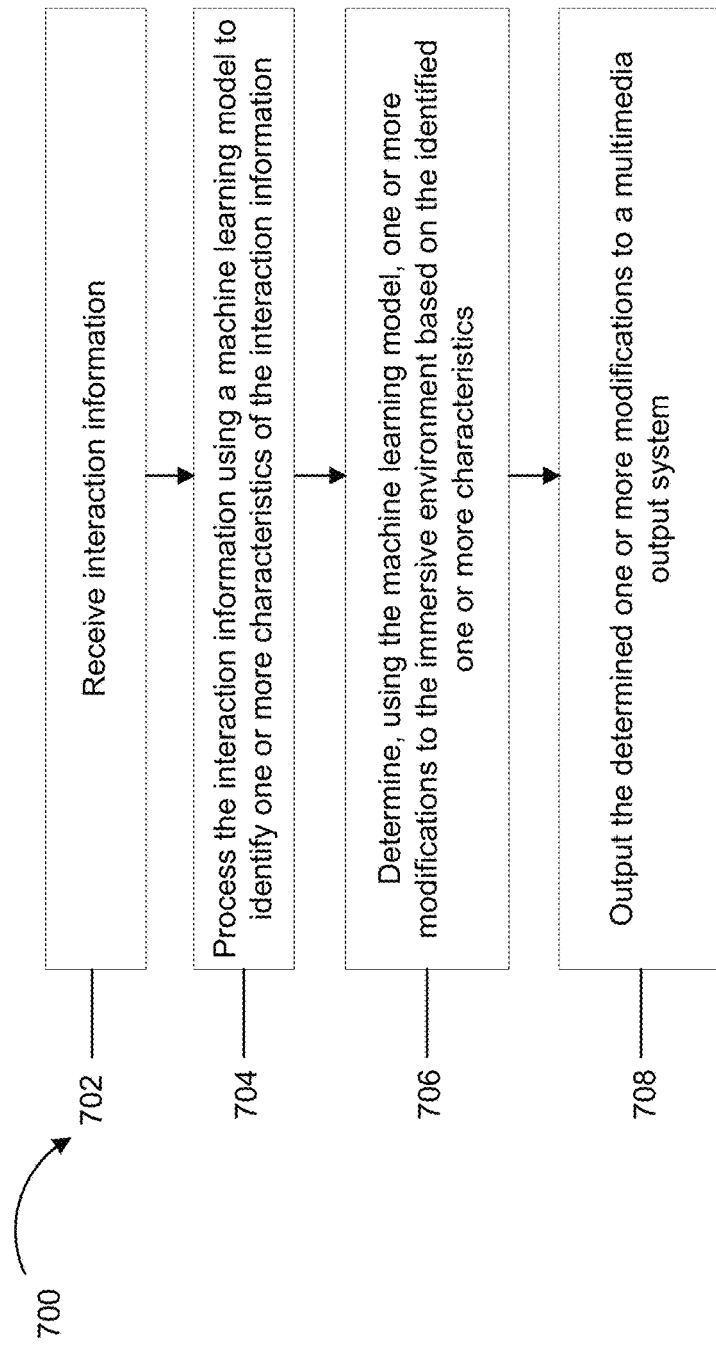

INTERACTIVE MULTIMEDIA STRUCTURE

CROSS-REFERENCE TO RELATED APPLICATION

This application claims the benefit of U.S. Provisional Patent Application No. 63/014,570, filed Apr. 23, 2020, the content of which is incorporated by reference herein in its entirety.

FIELD

Some example embodiments may generally relate to a structure, and, more particularly, to an interactive multimedia structure.

BACKGROUND

A video game is an electronic game that involves interaction with a user interface or input device, such as a joystick, controller, keyboard, or motion sensing device. The video game generates visual feedback for a player. The visual feedback is shown on a display device, such as a television set, a monitor, a touch screen, projections on a surface or a virtual reality headset.

SUMMARY

According to a first embodiment, an interactive multimedia structure may comprise a floor surface, a plurality of wall surfaces, a multimedia output system, one or more user input devices, and a tracking system. The multimedia output system may output one or more two-dimensional images on a majority of the plurality of wall surfaces to create an immersive environment. The immersive environment may comprise one or more virtual objects and one or more virtual environmental elements. The tracking system may track the one or more users interaction with the one or more user input devices within the interactive media structure. The multimedia output system may modify output of the one or more virtual objects based on the interaction.

In a variant, the interactive multimedia structure may further comprise a scoring system that is associated with computing one or more metrics based on tracking the one or more users interaction with the one or more input devices. In a variant, the one or more metrics may comprise a reward, a penalty, a skill level, a success or failure rate, or a biometric. In a variant, the interactive multimedia structure may further comprise a user input system associated with controlling the interactive multimedia structure, accessing one or more user services associated with the interactive multimedia structure, or accessing information related to use of the interactive multimedia structure. In a variant, the user input system may be accessible through one or more user devices of the interactive multimedia structure or is accessible through an application installed on user devices of the one or more users.

In a variant, the interactive multimedia structure may be connected, via a network, with one or more other interactive multimedia structures. In a variant, the one or more other interactive multimedia structures may be located within a same interactive housing structure as the interactive multimedia structure, located in one or more interactive housing structures that different from that of the interactive multimedia structure, located at a same location as the interactive multimedia structure, or located across one or more different locations from the interactive multimedia structure. In a variant, the one or more users interactions may cause one or more modifications in one or more immersive environments of the one or more other interactive multimedia structures.

In a variant, the interactive multimedia structure may be associated with one or more computing devices that perform at least the following: receive interaction information, process the interaction information using a machine learning model to identify one or more characteristics of the interaction information, determine, using the machine learning model, one or more modifications to the immersive environment based on the identified one or more characteristics, and outputting the determined one or more modifications to the multimedia output system. In a variant, the interaction information may be related to the one or more users interaction. In a variant, the machine learning model may be trained based on other interaction information. In a variant, the multimedia output system may configure the immersive environment based on profiles of the one or more users. In a variant, the multimedia output system may stream a multimedia feed of the immersive environment and/or the interactions to one or more displays.

In a variant, the immersive environment may further comprise avatars of the one or more users. In a variant, the tracking system may comprise one or more light distance and ranging devices or one or more motion capture devices. In a variant, the tracking may be performed based on a color of the one or more user input devices, a reflectivity of the one or more user input devices, a size of the one or more user input devices, or a shape of the one or more user input devices. In a variant, the immersive environment may further comprise one or more virtual representations of the one or more user input devices. In a variant, the multimedia output system may output the one or more two-dimensional images on the floor surface.

According to a second embodiment, an interactive housing structure may comprise at least one interactive multimedia structure. Each interactive multimedia structure may comprise a floor surface, a plurality of wall surfaces, a multimedia output system, one or more user input devices, and a tracking system. The interactive housing structure may further comprise a plurality of user services located within the interactive housing structure. The interactive housing structure may further comprise one or more sensors positioned within the interactive housing structure. The one or more sensors may be configured to receive instructions from a plurality of mobile devices sending requests to the one or more of the plurality of user services or the at least one interactive multimedia structure, and provide a response associated with the received instructions from the plurality of mobile devices.

The multimedia output system may output one or more two-dimensional images on a majority of the plurality of wall surfaces to create an immersive environment. The immersive environment may comprise one or more virtual objects and one or more virtual environmental elements. The tracking system may track the one or more users interaction with the one or more user input devices within the interactive media structure. The multimedia output system may modify output of the one or more virtual objects based on the interaction.

In a variant, the plurality of user services may comprise a retail service, a food service, an experience customization service, or a profile retrieval service. In a variant, the at least one interactive multimedia structure may further comprise a scoring system that is associated with computing one or more metrics based on tracking the one or more users interaction with the one or more input devices. In a variant, the one or more metrics may comprise a reward, a penalty, a skill level, a success or failure rate, or a biometric. In a variant, the at least one interactive multimedia structure may further comprise a user input system associated with controlling the at least one interactive multimedia structure, accessing the plurality of user services associated with the at least one interactive multimedia structure, or accessing information related to use of the at least one interactive multimedia structure.

In a variant, the user input system may be accessible through one or more user devices of the at least one interactive multimedia structure or is accessible through an application installed on user devices of the one or more users. In a variant, the at least one interactive multimedia structure may be connected, via a network, with each other or with one or more other interactive multimedia structures. In a variant, the one or more other interactive multimedia structures may be located in one or more other interactive housing structures different from the interactive housing structure, or located across one or more different locations from the at least one interactive multimedia structure.

In a variant, the one or more users interactions in one or more of the at least one interactive multimedia structure may cause one or more modifications in one or more immersive environments of the at least one interactive multimedia structure or of the one or more other interactive multimedia structures. In a variant, the at least one interactive multimedia structure may be associated with one or more computing devices that receive interaction information, process the interaction information using a machine learning model to identify one or more characteristics of the interaction information, determine, using the machine learning model, one or more modifications to the immersive environment based on the identified one or more characteristics, and output the determined one or more modifications to the multimedia output system. In a variant, the machine learning model may be trained based on other interaction information. In a variant, the interaction information is related to the one or more users interaction.

In a variant, the at least one multimedia output system may configure the immersive environment based on profiles of the one or more users. In a variant, the multimedia output system may stream a multimedia feed of the immersive environment and/or the interactions to one or more displays. In a variant, the immersive environment may further comprise avatars of the one or more users. In a variant, the tracking system may comprise one or more light distance and ranging devices or one or more motion capture devices. In a variant, the tracking may be performed based on a color of the one or more user input devices, a reflectivity of the one or more user input devices, a size of the one or more user input devices, or a shape of the one or more user input devices. In a variant, the immersive environment may further comprise one or more virtual representations of the one or more user input devices. In a variant, the multimedia output system may output the one or more two-dimensional images on the floor surface.

According to a third embodiment, a device may comprise at least one processor, and at least one memory including computer program code. The at least one memory and the computer program code may be configured to, with the at least one processor, cause the device at least to receive interaction information. The interaction information may be related to an interaction of one or more users with one or more user input devices within a structure that provides an immersive environment. The immersive environment may comprise one or more virtual objects and one or more virtual environmental elements. The immersive environment may be displayed on a majority of a plurality of wall surfaces of the structure to create the immersive environment.

The apparatus may be caused to process the interaction information using a machine learning model to identify one or more characteristics of the interaction information. The apparatus may be caused to determine, using the machine learning model, one or more modifications to the immersive environment based on the identified one or more characteristics. The machine learning model may be trained based on other interaction information. The apparatus may be caused to output the determined one or more modifications to a multimedia output system.

In a variant, the one or more characteristics may comprise a location of the interaction relative to the immersive environment, a speed of the interaction, an accuracy of the interaction, or success or failure of the interaction. In a variant, the one or more modifications may be related to a size of the one or more virtual objects, a speed of the one or more virtual objects, a location of the one or more virtual objects, or a quantity of the one or more objects. In a variant, the multimedia output system may output the immersive environment. In a variant, the interaction information may be gathered by a tracking system associated with the structure. In a variant, the structure may be connected, via a network, with one or more other structures in a same location as the structure or one or more other locations different from the structure.

Certain aspects or variants of the first, second, or third embodiments may be implemented as a method.

Certain aspects or variants of the first, second, or third embodiments may be implemented as an apparatus including at least one processor and at least one memory comprising computer program code. The at least one memory and computer program code may be configured, with the at least one processor, to cause the apparatus at least to perform a method according to certain aspects or variants.

Certain aspects or variants of the first, second, or third embodiments may be implemented as an apparatus that may include circuitry configured to cause the apparatus to perform a method according to certain aspects or variants.

Certain aspects or variants of the first, second, or third embodiments may be implemented as an apparatus that may include means for performing a method according to certain aspects or variants. Examples of the means may include one or more processors, memory, and/or computer program codes for causing the performance of the operation.

Certain aspects or variants of the first, second, or third embodiments may be implemented as a computer readable medium comprising program instructions stored thereon for causing an apparatus to perform at least a method according to certain aspects or variants.

Certain aspects or variants of the first, second, or third embodiments may be implemented as a computer program product encoding instructions for causing an apparatus to perform at least a method according to certain aspects or variants.

BRIEF DESCRIPTION OF THE DRAWINGS

For proper understanding of example embodiments, reference should be made to the accompanying drawings, wherein:

FIGS. 1a-1i illustrate various examples of one or more interactive multimedia structures, according to some embodiments;

FIG. 6 illustrates an example flow diagram of a method, according to some embodiments;

FIG. 7 illustrates an example flow diagram of a method, according to some embodiments.

DETAILED DESCRIPTION

Figure 1A:
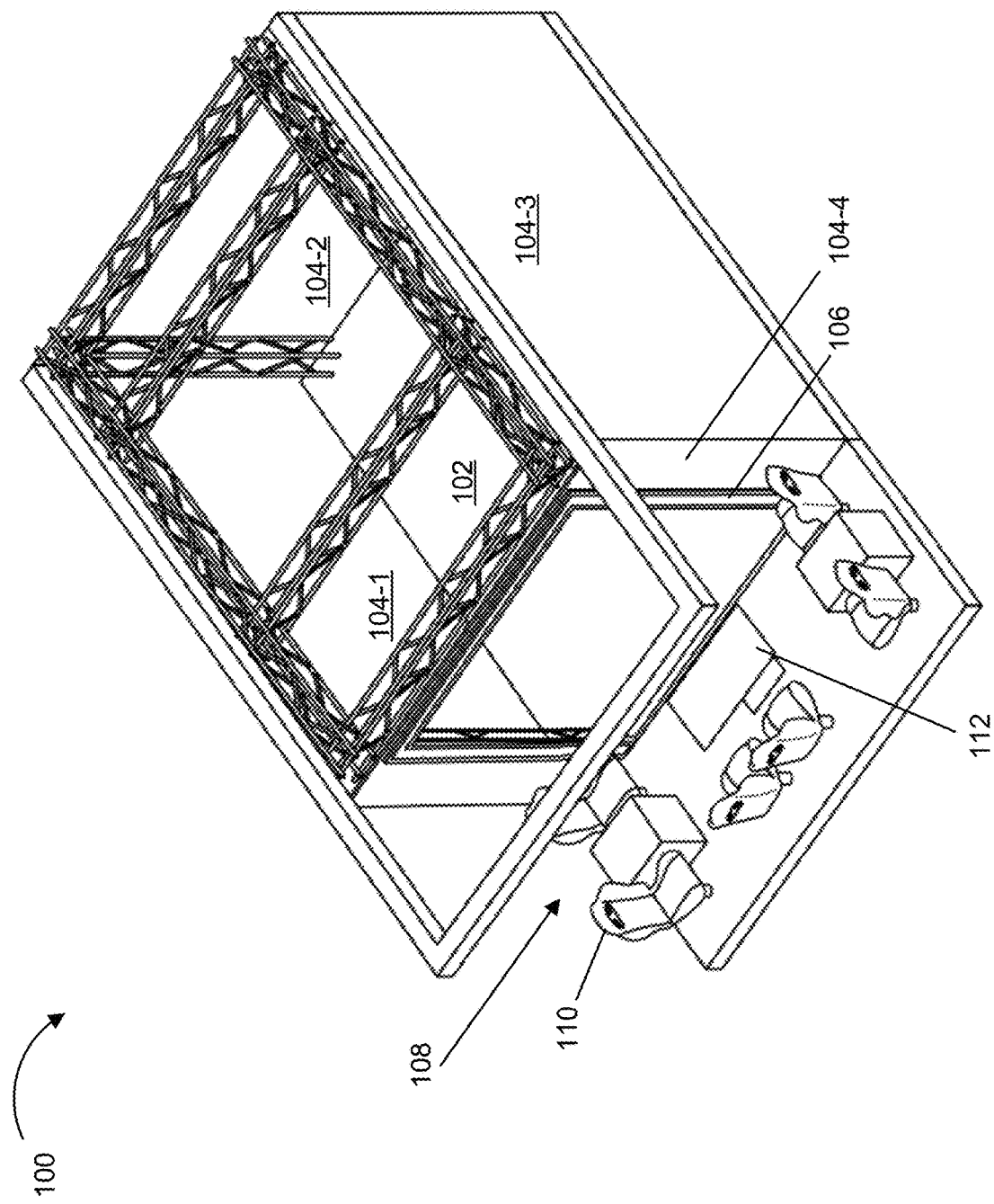

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products related to an interactive multimedia structure is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

A video game may be an electronic game that involves interaction with a user interface or input device, such as a joystick, controller, keyboard, or motion sensing device. The video game may generate visual feedback for a player. The visual feedback may be shown on a display device, such as a television set, a monitor, a touch screen, or a virtual reality headset. However, video games do not provide immersive environments in which a user (or multiple users) can use a user device to interact with the immersive environment.

Some embodiments described herein may provide for an interactive multimedia structure. For example, the interactive multimedia structure may include a plurality of walls on a majority of which an immersive environment is displayed. At least one user may interact with the immersive environment through manipulation of a user input device, which may be tracked by one or more systems associated with the interactive multimedia structure. Based on the manipulation, the one or more systems may modify the immersive environment displayed on the majority of the walls. In certain embodiments, the one or more systems may process interaction information of the user with the one or more user input devices to adaptively and intelligently modify the immersive environment. In this way, certain embodiments may provide an immersive environment that can provide an enhanced user experience that cannot be provided by video games. These and other aspects are described elsewhere herein.

Figure 1B:
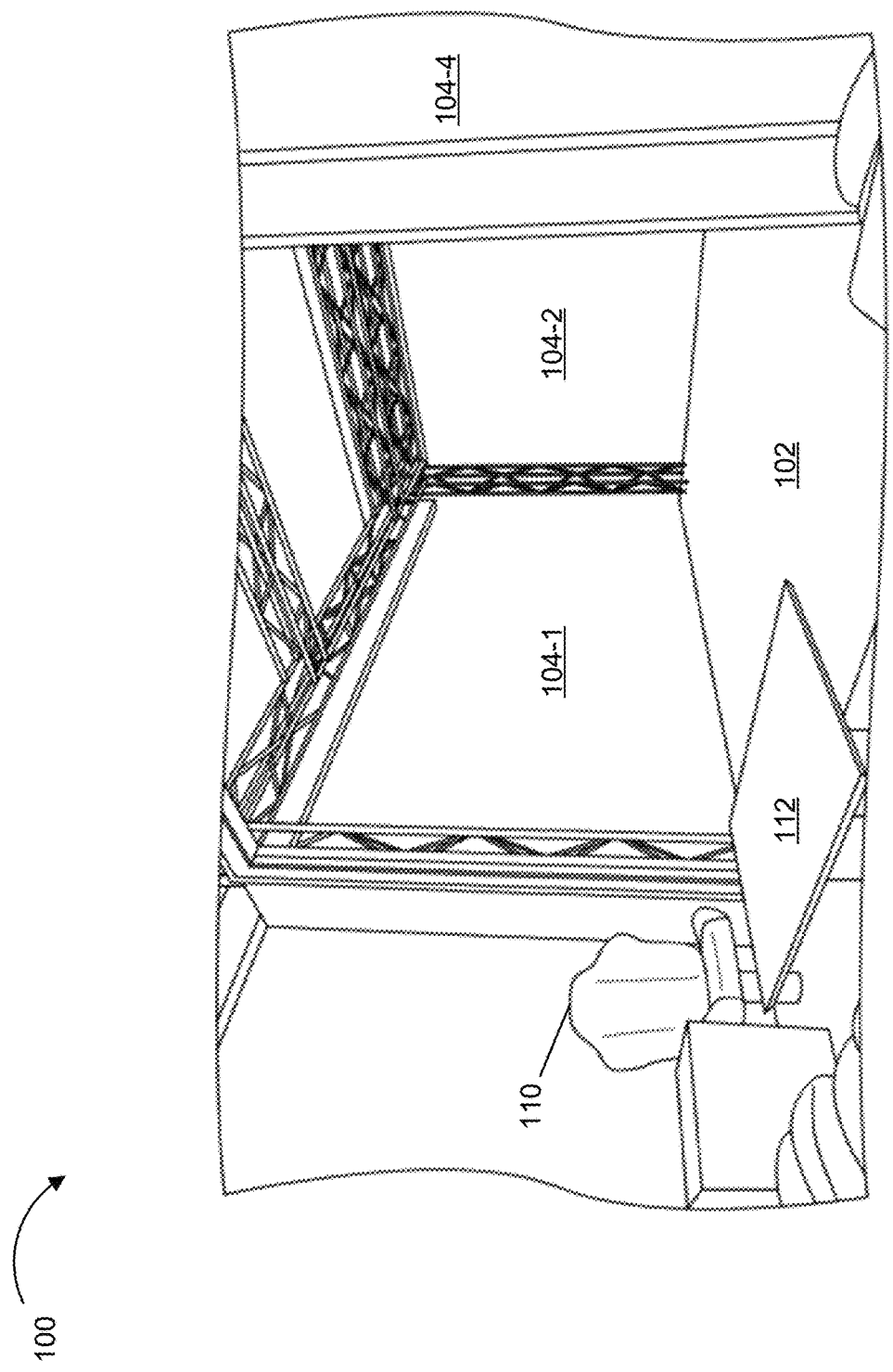
Figure 1C:
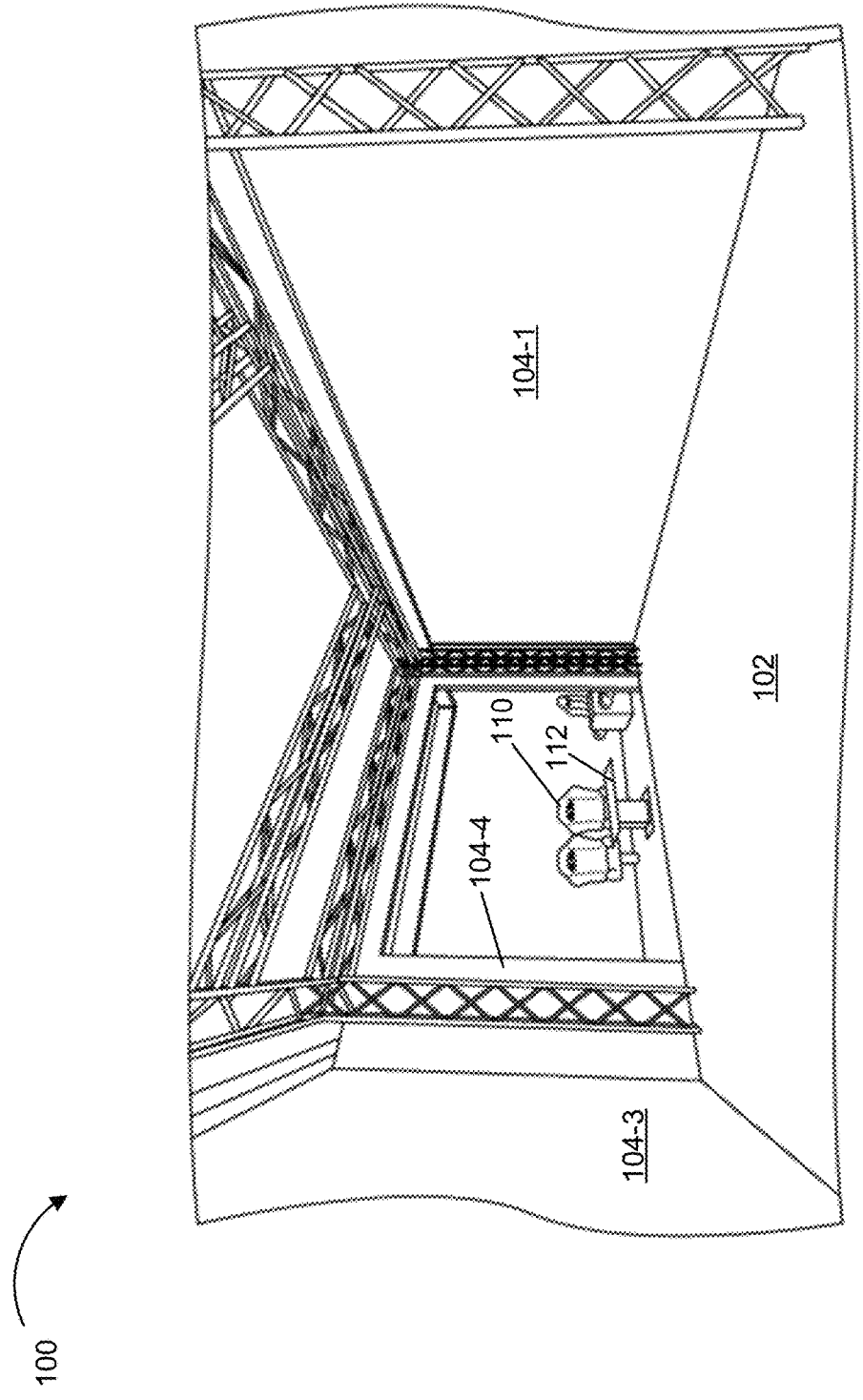

FIGS. 1*a*-1*i* illustrate various examples of one or more interactive multimedia structures, according to some embodiments. FIGS. 1*a*-1*c* illustrate an example of a quadrilateral-shaped interactive multimedia structure 100. As illustrated in FIG. 1*a*, the interactive multimedia structure 100 includes a floor surface 102. The floor surface 102 may include one or more types of surface materials, such as carpet, hardwood, grass, sand, tile, laminate, vinyl, asphalt, concrete, etc. The floor surface 102 may depend on intended use of the interactive multimedia structure 100. For example, as described elsewhere herein, the interactive multimedia structure 100 may provide an immersive sports-related environment, and the floor surface 102 may be matched to the theme of the multimedia content. For example, for a basketball themed game, the floor surface 102 may be a wood surface, an acrylic painted surface or with appropriate license, the image of a well-known basketball court like Madison Square Garden may be projected on to the floor surface 102.

The interactive multimedia structure 100 may further include a plurality of wall surfaces 104, shown as four wall surfaces 104-1, 104-2, 104-3, and 104-4. Other example interactive multimedia structures 100 may include a different number of wall surfaces 104. At least one of the wall surfaces 104 (e.g., wall surface 104-1 in FIG. 1*a*) may include an entry 106 into a room formed by the wall surfaces 104, where an immersive environment is to be displayed (which may be referred to herein as an "interactive area"). In certain embodiments, the interactive multimedia structure 100 may include a single wall surface 104 that extends across a range of angles around a reference point. For example, the interactive multimedia structure 100 may include a curved wall 104 (or a series of panels that form a curved wall 104) that extends across a range of angles around a center point on the floor surface 102.

The interactive multimedia structure 100 may display an immersive environment on the wall surfaces 104. For example, the immersive environment may comprise a plurality of two-dimensional or three-dimensional images that are displayed a majority of the wall surfaces 104 (or are displayed on two wall surfaces 104 in the case that the interactive multimedia structure 100 just includes two wall surfaces 104). When a single wall surface 104 is included in interactive multimedia structure 100 (e.g., when a curved wall 104 is used), the wall 104 may extend across a range of angels that includes more than 180 degrees.

The immersive environment may include one or more virtual objects (e.g., a computer-controlled object associated with a multimedia experience, described elsewhere herein), a virtual representation of a user input device (e.g., a virtual ball that is a virtual representation of a physical ball used by a user in the interactive multimedia structure 100), a virtual representation of a user of the interactive multimedia structure 100 (e.g., an avatar), a virtual representation of an environmental element of the immersive environment (e.g., elements of an environment of a multimedia experience, such as an arena), and/or the like.

In some embodiments, the immersive environment may include non-virtual objects or effects associated with the virtual objects and/or environmental elements. In addition to the senses of sight and hearing, these non-virtual objects within the interactive multimedia structure 100 may also engage or stimulate the user's sense of touch, smell, and the like. For example, the interactive multimedia structure 100 may include a motion base or special effect devices for providing a user with various effect to engage, which may be installed on the floor surface 102 or the walls 104. With these special effect devices installed, the user does not simply view or interact with the multimedia experience, but they may feel the effects, such as sound, touch, smell, motion, water, wind, smoke, flash, and heat, synchronized with the multimedia experience, so that the user's interests and immersion in the multimedia experience may be improved. In another example, the special effect devices may also include other physical objects for a user to interact with (e.g., an obstacle course on which virtual objects or environmental elements are displayed), and/or the like. Additionally, or alternatively, there may be one or more physical objects in the interactive multimedia structure 100, where cameras capture images of those physical objects and one or more systems described herein may render a virtual representation of the physical objects in the immersive environment. For example, one or more users of the interactive multimedia structure 100 may build a physical structure in an interactive area of the interactive multimedia structure 100 as part of a game, which may be rendered in the interactive environment.

A multimedia experience may include a computer video game, broadcast of live events (e.g., where the immersive environment is provided from the perspective of a team bench or a team owner's seating box during the live event), a skills challenge, a movie, music (e.g., for karaoke), a photographic opportunity (e.g., where users of the interactive multimedia structure 100 can have their picture taken and overlain on a sports team facility, images or an image of a player of a sports team), and/or another type of entertainment or educational content. The multimedia experience may vary from a wide variety of genres and titles.

The interactive multimedia structure 100 may be associated with a multimedia output system (not shown in FIGS. 1*a*-1*i*). The multimedia output system may include one or more computing devices (e.g., one or more apparatuses 10 of FIG. 8). The multimedia output system may generate one or more two-dimensional or three-dimensional images that form the immersive environment. The multimedia output system may modify the two-dimensional or three-dimensional images, for example, based on user interaction with a user input device. After generating or modifying the immersive environment, the multimedia output system may output the immersive environment. For example, the multimedia output system may include one or more display screens or interactive display tiles mounted on, or that form, the wall surfaces 104, may include one or more projectors arranged to project on to the wall surfaces 104, and/or the like.

As further illustrated in FIG. 1*a*, the interactive multimedia structure 100 may be associated with a spectator area 108. For example, the spectator area 108 may be arranged so that individuals in the spectator area 108 can view the interior of the wall surfaces 104. The spectator area 108 may be partially or totally enclosed, or may be open. The spectator area 108 may include one or more seating structures 110 (e.g., chairs, benches, and/or the like) that are arranged in rows, columns, in stadium-style seating, and/or the like. The spectator area 108 may further include a user device 112 (e.g., an apparatus 10 of FIG. 8). The user device 112 may be associated with a control system (not shown in FIGS. 1*a*-1*i*) that includes one or more computing devices. The user device 112 may be used to control one or more systems described herein associated with the interactive multimedia structure 100. For example, the user device 112 may control the particular immersive environment that is output, may control a difficulty level for a game or skills challenge associated with the immersive environment, may display scores or a ranking for players or teams participating in the game or skills challenge, may provide account access to accounts of users of the interactive multimedia structure 100, may control an ambiance or environmental conditions of the interactive multimedia structure 100, and/or the like.

Additionally, or alternatively, the user device 112 may be associated with one or more user services associated with the interactive multimedia structure 100. For example, the interactive multimedia structure 100 may be associated with a larger area, such as a building, and the one or more user services may include food services, retail services, and/or the like. A user of the user devices 112 may access the one or more user services, such as to order food, purchase merchandise, and/or the like. In certain embodiments, a robot within a building or associated with the interactive multimedia structure 100 may deliver products related to the user services.

The user device 112 may be mounted to a portion of the interactive multimedia structure 100 or may be a mobile device (e.g., a tablet, a mobile phone, and/or the like). As described elsewhere herein, in the case of a mobile device, each user of the interactive multimedia structure 100 may be able to use an application (e.g., application 128 described below) installed on the mobile device to control the interactive multimedia structure 100, to access the one or more user services, and/or the like.

Figure 1D:
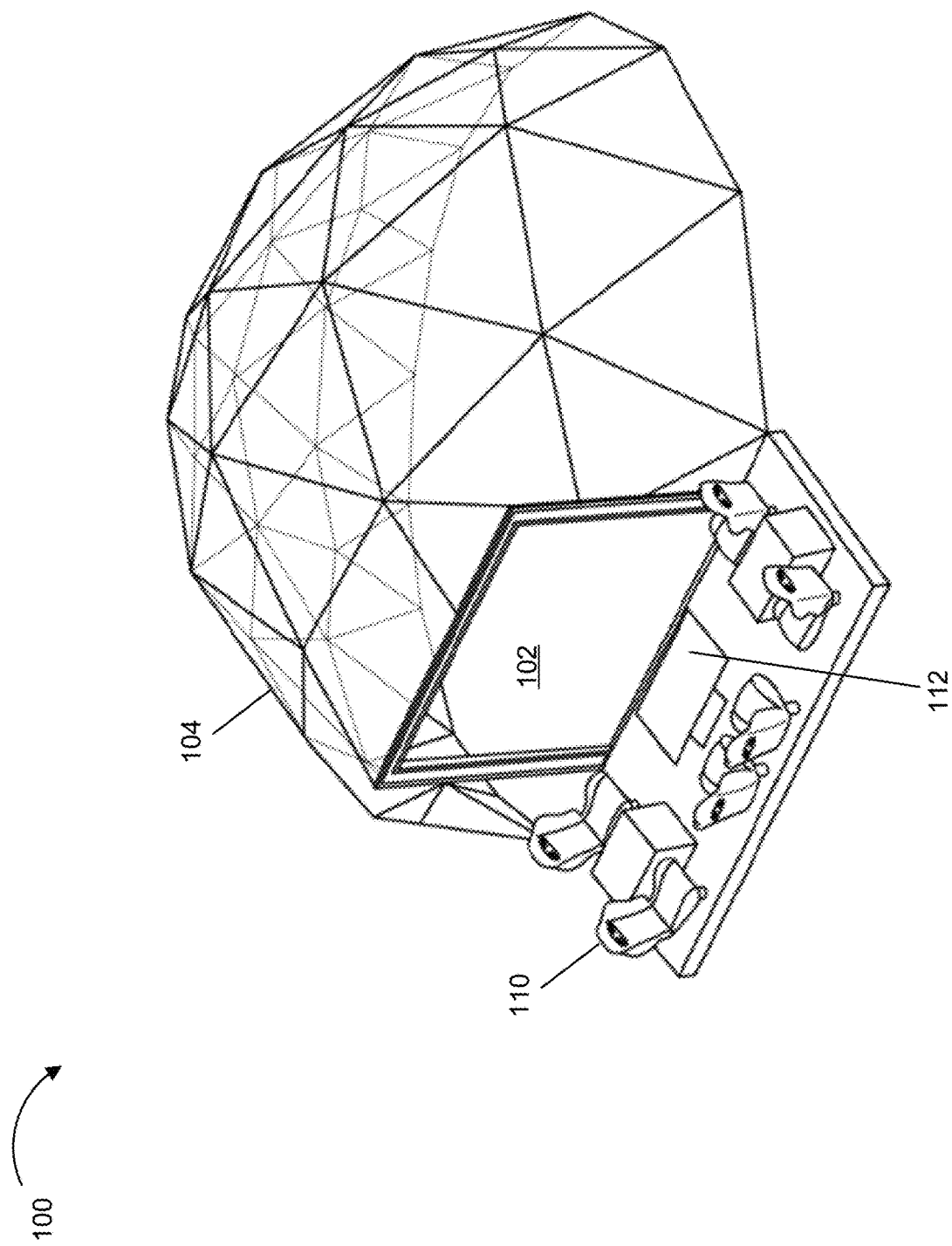
Figure 1E:
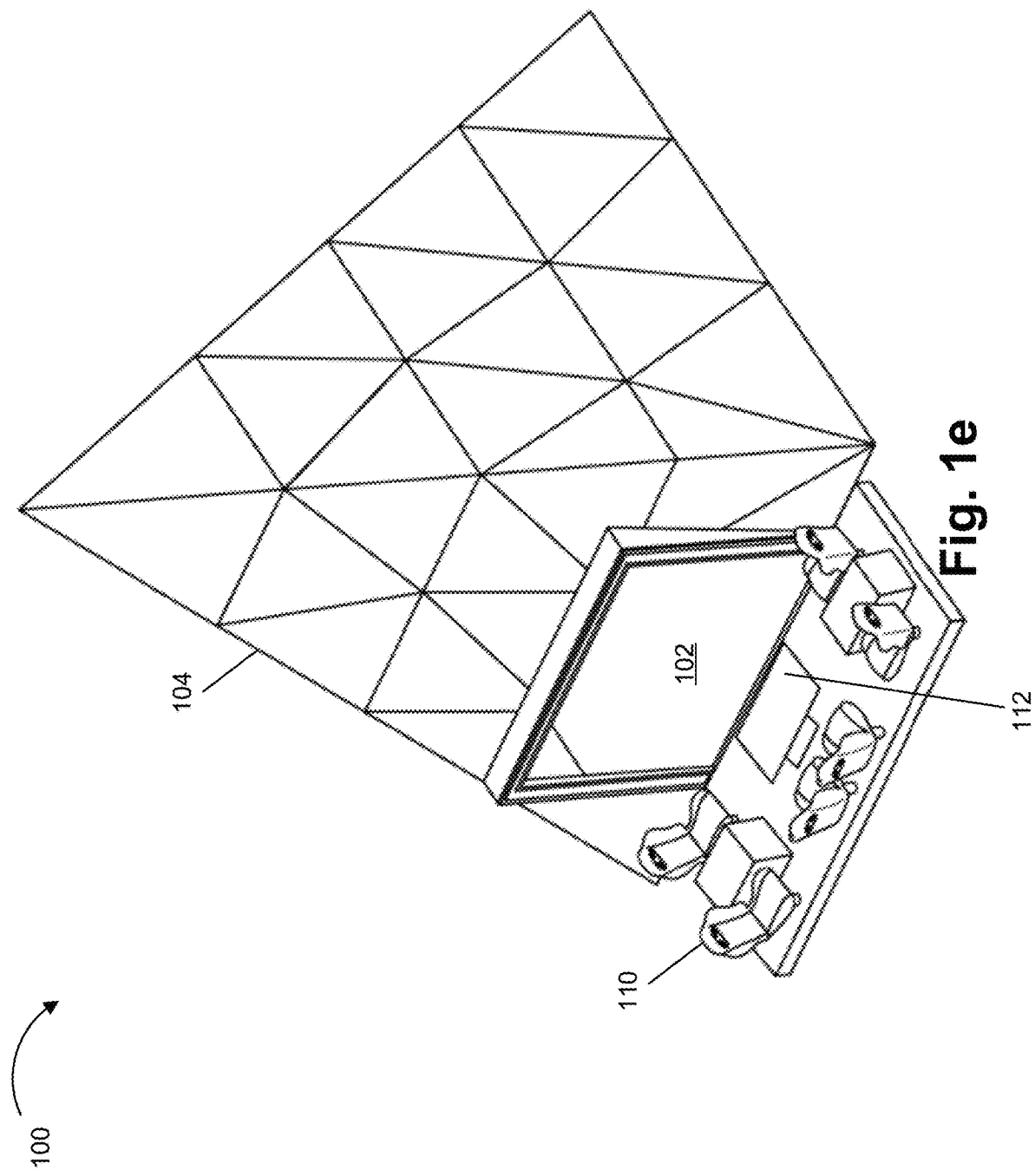

FIG. 1*b* illustrates certain aspects described in the context of FIG. 1*a* from a vantage point in the spectator area 108. FIG. 1*c* illustrates certain aspects described in the context of FIG. 1*a* from the vantage point in the immersive area surrounded by the wall surfaces 104. In some alternatives, the interactive multimedia structure 100 may be constructed in the form of any geometric shape. FIGS. 1*d* and 1*e* illustrate other shapes of the interactive multimedia structure 100. For example, FIG. 1*d* illustrates a geodesic dome-shaped, or cave-shaped, interactive multimedia structure 100, and FIG. 1*e* illustrates a pyramid-shaped interactive multimedia structure 100.

FIG. 1*f* illustrates various examples of the ways in which users can use the interactive multimedia structure 100. For example, and as illustrated at 114, the interactive multimedia structure 100 may be used in a scenario where there is a single user in the immersive area where the immersive environment is displayed. As illustrated at 116, the interactive multimedia structure 100 may be used in a scenario where there are multiple users in the immersive area where the immersive environment is displayed.

FIG. 1*g* illustrates various deployment scenarios for one or more interactive multimedia structures 100. For example, and as illustrated at 118, a location may include multiple interactive multimedia structures 100. The multiple interactive multimedia structures 100 may be networked together to provide a multimedia experience coordinated across different interactive multimedia structures 100. Users of different interactive multimedia structures 100 may be able to communicate with each other using a user interface that is part of the immersive environment or accessed through a user device 112, 130. For example, the users may communicate using input commands by interacting with user interface elements of the immersive environment (e.g., to send a pre-defined text or sound message or an emoji to another interactive multimedia structure 100), by speaking into a microphone (e.g., to provide voice or speech-to-text communications), using a chat or texting function (e.g., WeChat™, short message service (SMS) messaging, or the like), by capturing and sending an image or video, or the like. In some alternatives, the interactive multimedia structures 100 may provide translation functionality for the aforementioned communications. As illustrated at 120, the interactive multimedia structure 100 may provide a self-contained immersive environment for users of that interactive multimedia structure 100. As illustrated at 122, multiple interactive multimedia structures 100 may be distributed across multiple locations (e.g., multiple cities, multiple facilities in the same city, and/or the like). In this case, the interactive multimedia structures 100 may be networked together to provide a multimedia experience coordinated across the different interactive multimedia structures 100. In some embodiments, one or more networked interactive multimedia structures 100 may be configured for tournament-style play to create an e-Sports event. For example, users of different interactive multimedia structures 100 may be matched to play a competitive or cooperative game or skills challenge based on data related to their past uses of the interactive multimedia structures 100 (e.g., the data may be processed using a machine learning model, and the users matched based on user skill level as determined by the machine learning model).

As another example, a multimedia experience may include a karaoke experience across multiple interactive multimedia structures 100, where lyrics are projected as part of an immersive environment, and the immersive environment may be modified based on a user's accuracy with respect to singing the lyrics.

In some embodiments, an interactive multimedia structure 100 may be networked with a mobile phone or a desktop or laptop computer, or a virtual reality device. For example, a user of the interactive multimedia structure 100 may participate in a multimedia experience with a user of the mobile phone or computer. Continuing with the previous example, a user of the interactive multimedia structure 100 and the mobile phone or computer may play a game or participate in a skills challenge with each other. In this way, certain embodiments may provide an extended reality experience in one location, and another type of experience at a remote location (e.g., a virtual reality experience), thereby providing a shared experience across various types of devices and/or locations. In certain embodiments, application 128 may interact with one or more systems described herein, sensors of an interactive structure or an interactive multimedia structure 100, and/or the like.

Figure 1H:
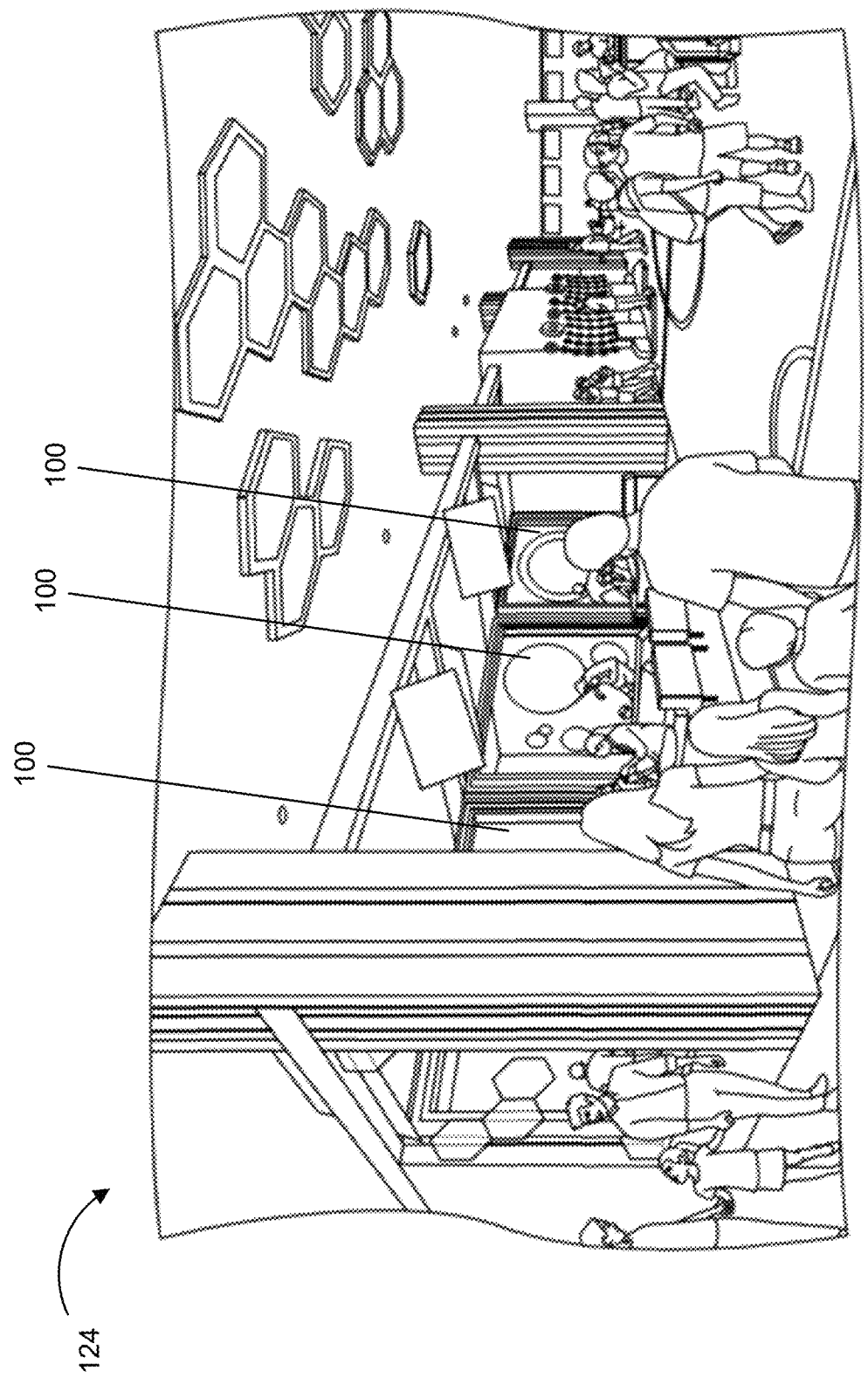
Figure 1I:
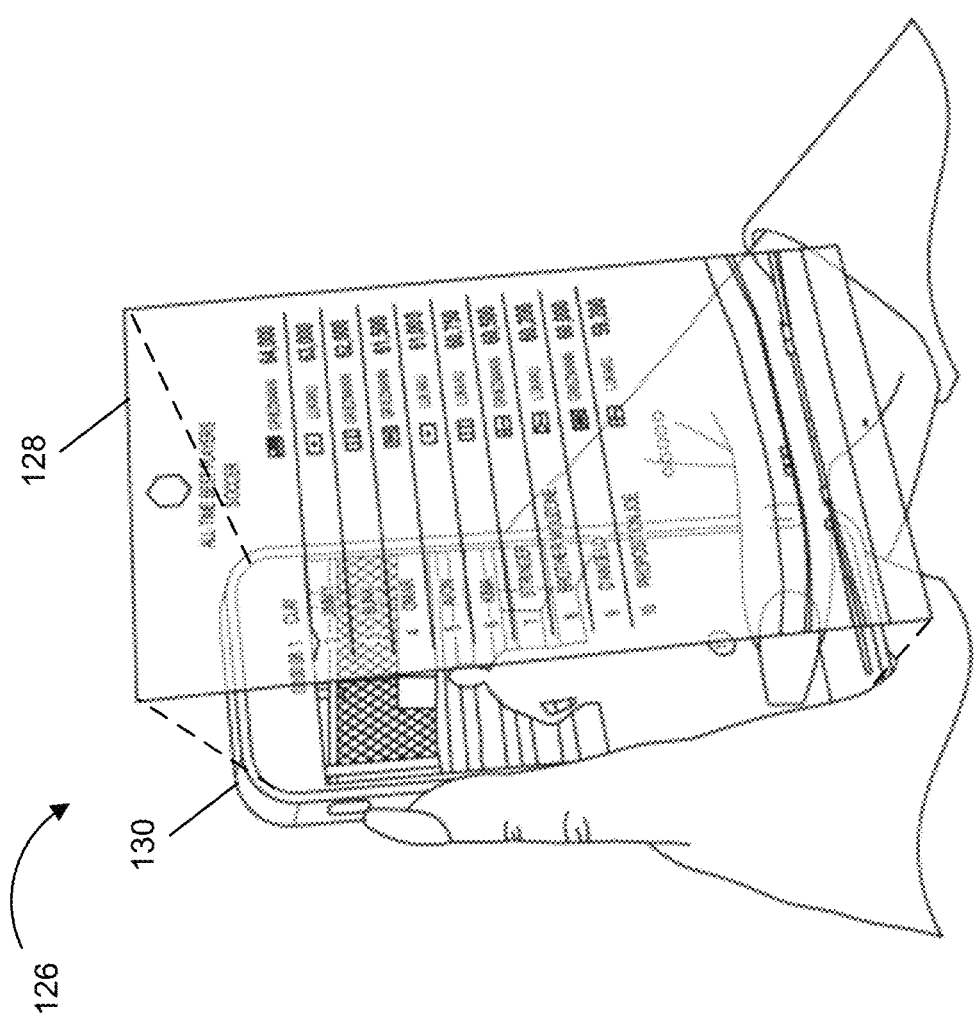

FIG. 1*h* illustrates a portion of an example interactive housing structure 124 in which one or more interactive multimedia structures 100 may be deployed. For example, FIG. 1*h* illustrates an interior of a larger building, such as a smart building, in which one or more interactive multimedia structures 100 may be located. A plurality of user services may be associated with (e.g., positioned within) the interactive housing structure 124. In addition, there may be one or more sensors (not shown in FIG. 1*h*) associated with the interactive housing structure 124. The one or more sensors may communicate with user devices 130 (e.g., mobile phones, smart watches, etc.) of individuals, such as to detect a presences of the individuals (e.g., to check them into a reservation), to configure an interactive multimedia structure 100 for the individual (e.g., by gathering configuration settings based on an identity of the user), to allow the user to use the one or more user services, and/or the like. In certain embodiments, and as illustrated in FIG. 1*i* at 126, a user may interact with a sensor or a network associated with the building using an application 128 on a user device 130 to access services, to reserve interactive multimedia structure 100, to configure interactive multimedia structure 100, to view data related to use of interactive multimedia structure 100, and/or the like. In certain embodiments, application 128 may comprise one or more mini-programs that provide services described herein. For example, user device 130 may comprise an application that comprises a payment mini-program, a chat mini-program, and/or the like, such as WeChat™.

In another embodiment, the interactive multimedia structure 100 may request data from a user during the user's engagement with the multimedia experience on the interactive multimedia structure 100. The requested data may be used to create a user profile, which may include a user's username, related statistics for the user, and/or the like. The statistics of each user may be obtained from the interactive multimedia structure 100. For example, the statistics may include total time the user has spent engaging with the multimedia content, progression or completion of the multimedia experience, rewards issued by the interactive multimedia structure 100 based on the user's engagement with the multimedia experience, and/or the like. The statistics may be used to characterize the user's skill related to the multimedia experience. In some alternatives, the user may be able to link their social media account with their user profile.

In another embodiment, the user profile may be implemented with blockchain. The user profile may include a reward system, which may be cash, a prize, or some other award. In some alternatives, the reward may be redeemable for services, currency or other goods of value available within the interactive housing structure 124 or outside of the interactive housing structure 124. In some alternatives, the user profile may represent in-game multimedia content assets as non-fungible tokens, which users may be able to resell to others, and/or the like.

As described above, FIG. 1*a*-1*i* are provided as an example. Other examples are possible, according to some embodiments.

Figure 2A:
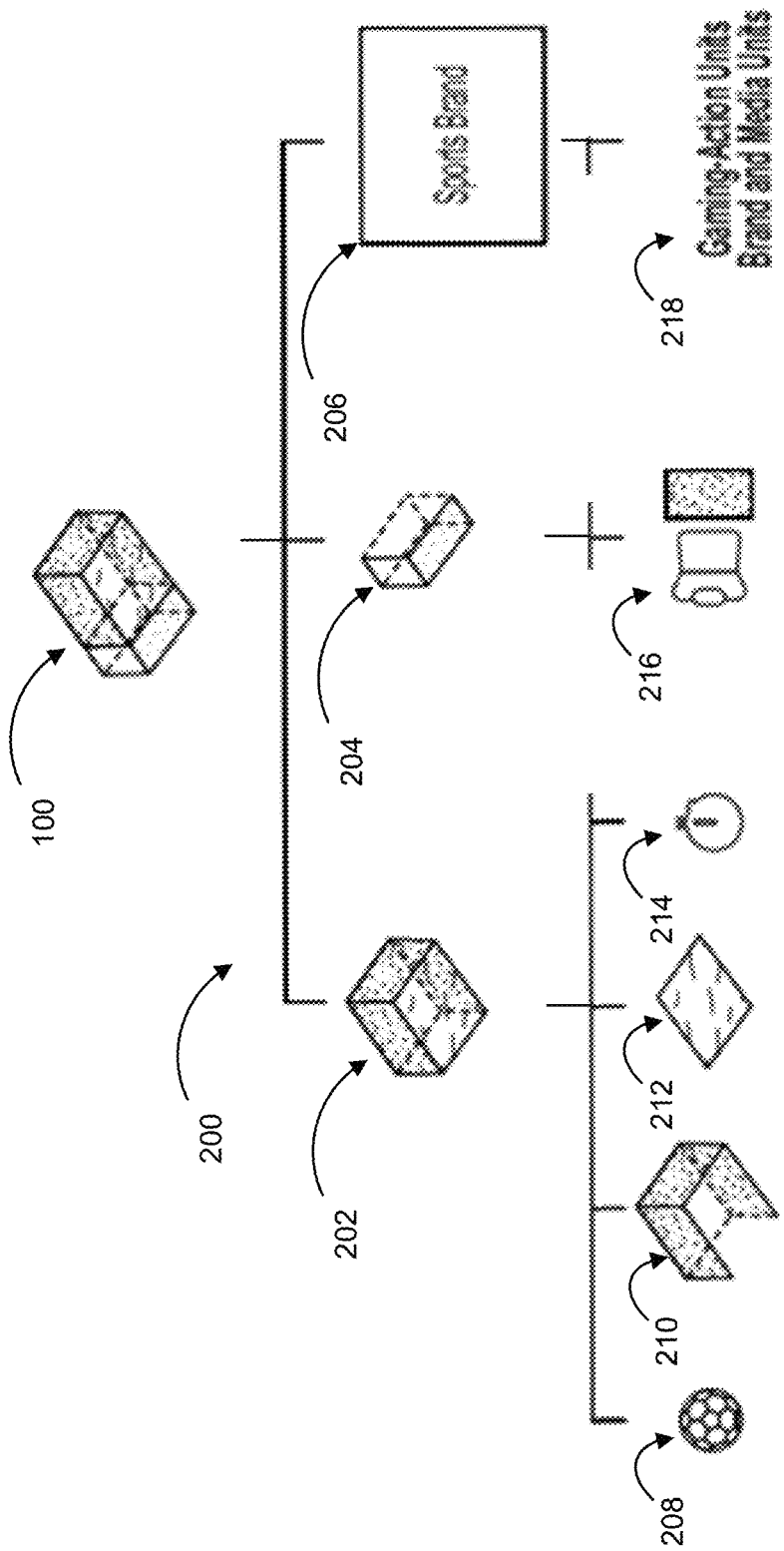
FIGS. 2*a* and 2*b* illustrate various example components of an example interactive multimedia structure, according to some embodiments.
Figure 2B:
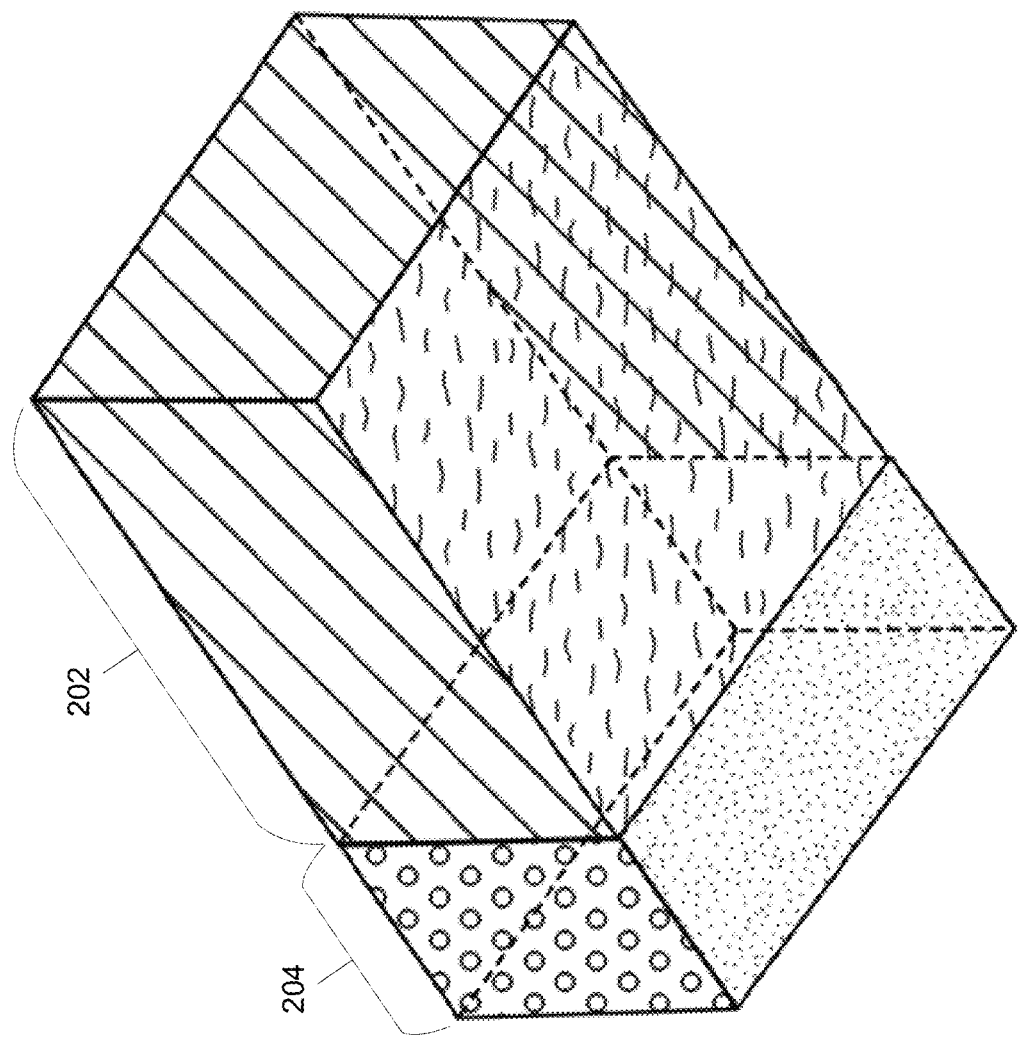

FIGS. 2*a* and 2*b* illustrate various example components of an example interactive multimedia structure 100, according to some embodiments. For example, FIGS. 2*a* and 2*b* may illustrate various example components 200 of an interactive multimedia structure 100. As illustrated at 202 of FIG. 2*a*, the interactive multimedia structure 100 may include an immersive area where an immersive environment is provided for display. For example, if the interactive multimedia structure 100 provides an immersive environment related to football, the immersive environment may be provided in the immersive area. As illustrated at 204, the interactive multimedia structure 100 may be associated with a spectator area (e.g., a spectator area 108 in FIGS. 1*a*-1*i*). For example, and continuing with the football example, the spectator area 202 may be a bench or other seating structure that resembles those found in a football stadium. As illustrated at 206, the interactive multimedia structure 100 may be associated with branding. For example, the interactive multimedia structure 100 may have branding on surfaces, seating structures, and/or the like, users may be able to wear replica uniforms for a sports team, aspects of the interactive multimedia structure 100 may resemble those in a particular sports stadium, and/or the like.

As illustrated at 208, the interactive multimedia structure 100 may be associated with a user input device. In the example of FIG. 2a, the user input device is a football for use a floor surface, which may be based on the interactive multimedia structure 100 being associated with providing a football-related immersive environment. Different types of user input devices may be used depending on the context. For example, another type of ball, a member (e.g., a pole or a sword), a glove, a shoe, a body attachment (e.g., body armor or a helmet), and/or the like may be used as user input devices. The interactive multimedia structure 100 may leverage new technologies for user input by its able-bodied users and its users with disabilities, including users with visual, auditory, motor, and cognitive disabilities. In some alternatives, these new technologies may be used by the aforementioned users to infer multimedia experience events of importance to such users. For example, such new technologies may include, gesture capture technology, where the interactive multimedia structure 100 may monitor the physical actions of the user to determine the responsive actions of an avatar of the player in the immersive environment. Additionally, voice commands and comments of the user during the multimedia experience may be used to determine levels of player excitement. Additionally, or alternatively, a user's body part (e.g., a hand gesture), a sound (e.g., a voice command), and/or a biometric (e.g., a fingerprint, a voice characteristics, and/or the like) can be used to input commands to the interactive multimedia structure 100, and can be used in place of other user input devices discussed herein, can be used to access and manipulate a user's profile, and/or the like. The interactive multimedia structure 100 may provide translation operations (e.g., may translate voice commands from one language to another, may translate voice or text communications between interactive multimedia structures 100, may output speech or display text in various languages, and/or the like). As illustrated at 210, the interactive multimedia structure 100 may be associated with a plurality of walls (e.g., wall surfaces 104 of FIGS. 1a-1i). The plurality of wall surfaces may extend across a majority of a range of angles around the surface. For example, in the example of FIGS. 2a and 2b, the interactive multimedia structure 100 has a quadrilateral shape, and the plurality of walls may surround at least three of the four sides of the interactive multimedia structure 100. As illustrated at 212, the interactive multimedia structure 100 may include a surface (e.g., a floor surface 102) associated with the immersive area. For example, if the interactive multimedia structure 100 provides an immersive environment related to a football environment, the surface may resemble a football pitch (e.g., may have printed side lines, or other lines, may comprise grass or turf, and/or the like).

As illustrated at 214, the interactive multimedia structure 100 may provide various multimedia experiences, such as games, skills challenges, movies, and/or the like. For example, the multimedia may include a time-based challenge, an accuracy-based challenge, and/or the like, as described elsewhere herein. As illustrated at 216, the spectator area may include a screen associated with a user device (e.g., user device 112 of FIGS. 1a-1i). As illustrated at 218, the interactive multimedia structure 100 may include gaming units, brand and media units, and/or the like depending on the branding associated with interactive multimedia structure 100.

FIG. 2b illustrates an arrangement of certain components from FIG. 2a. For example, the spectator area 204 may be located at one side of the interactive area 202, where the immersive environment may be displayed on wall surfaces associated with the other sides of the floor surface of the interactive area. The spectator area 204 may be level with, or elevated relative to, the floor surface of the immersive area (e.g., may be matched to a location associated with branding associated with the interactive multimedia structure 100).

As indicated above, FIGS. 2a and 2b are provided as an example. Other examples are possible, according to some embodiments.

Figure 3B:
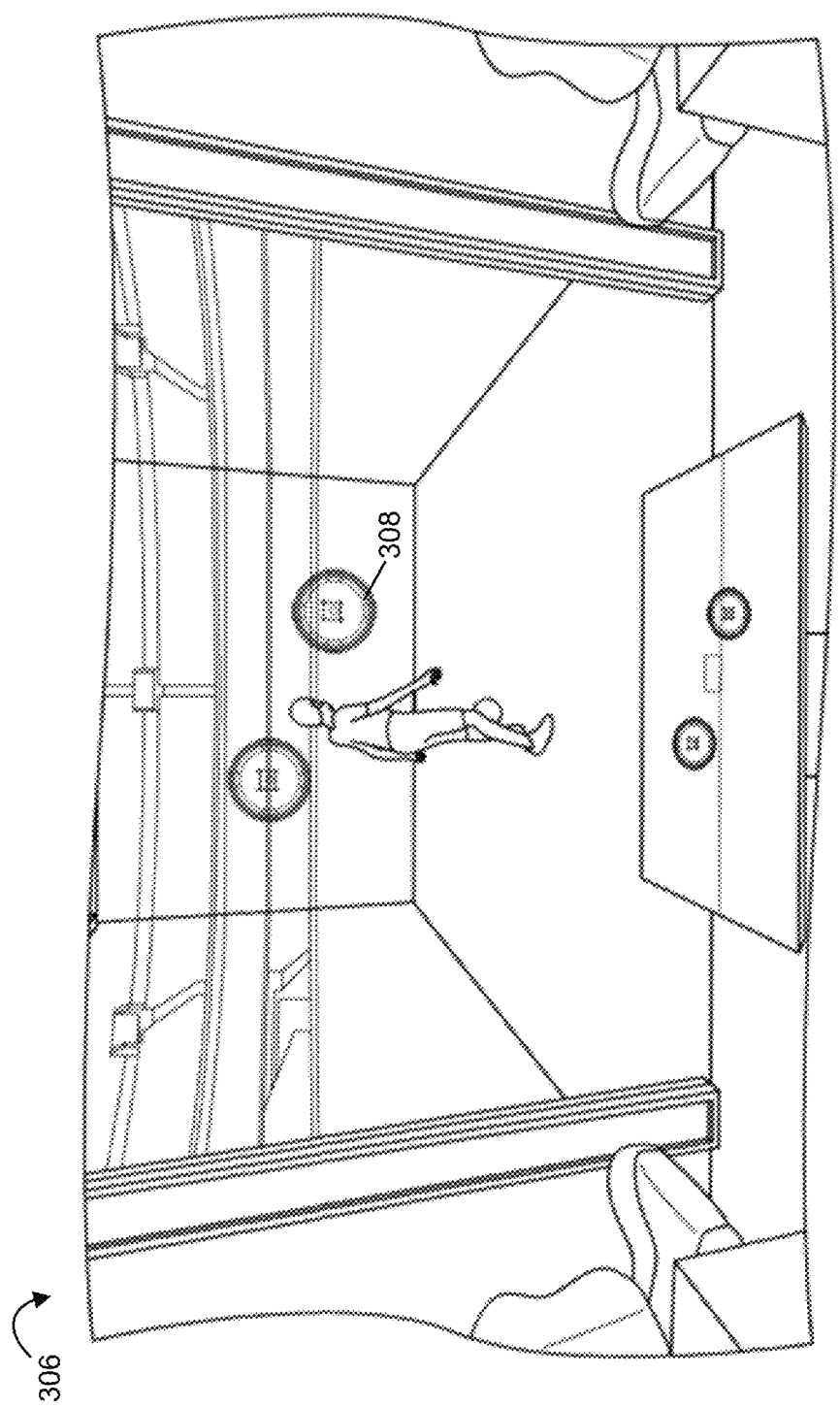
FIGS. 3*a*-3*o* illustrate example immersive environments, according to some embodiments.
Figure 3D:
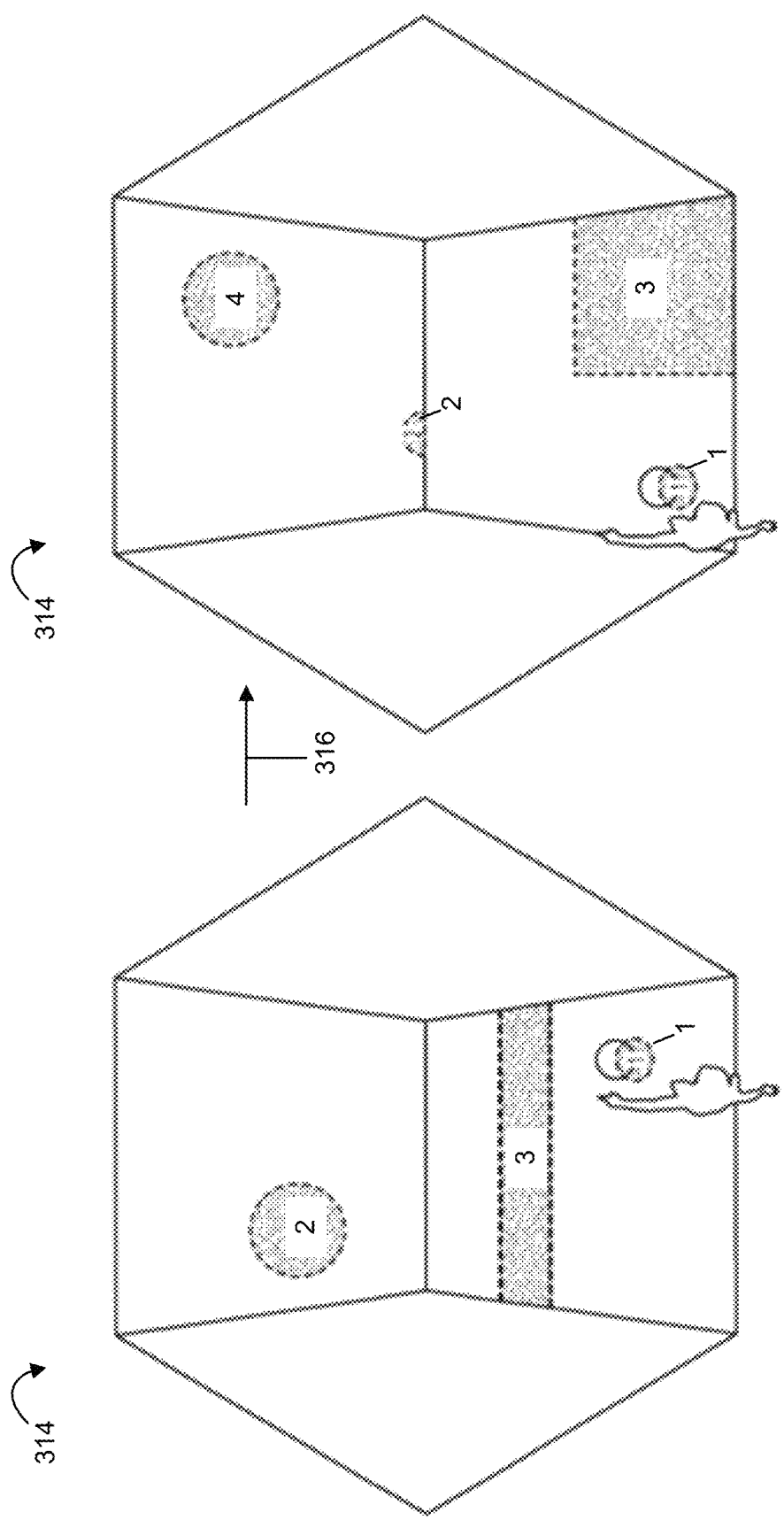
Figure 3H:
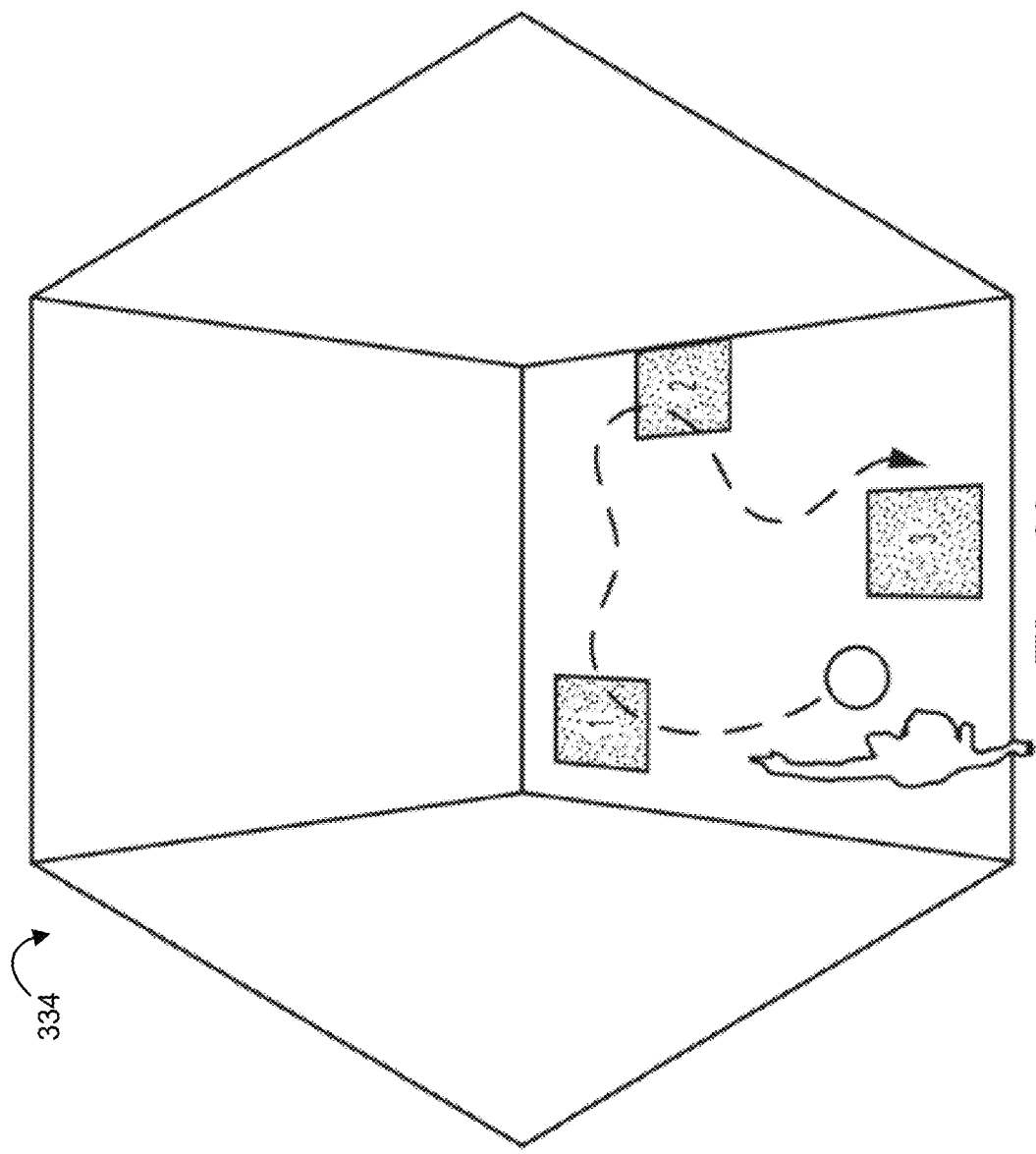
Figure 3I:
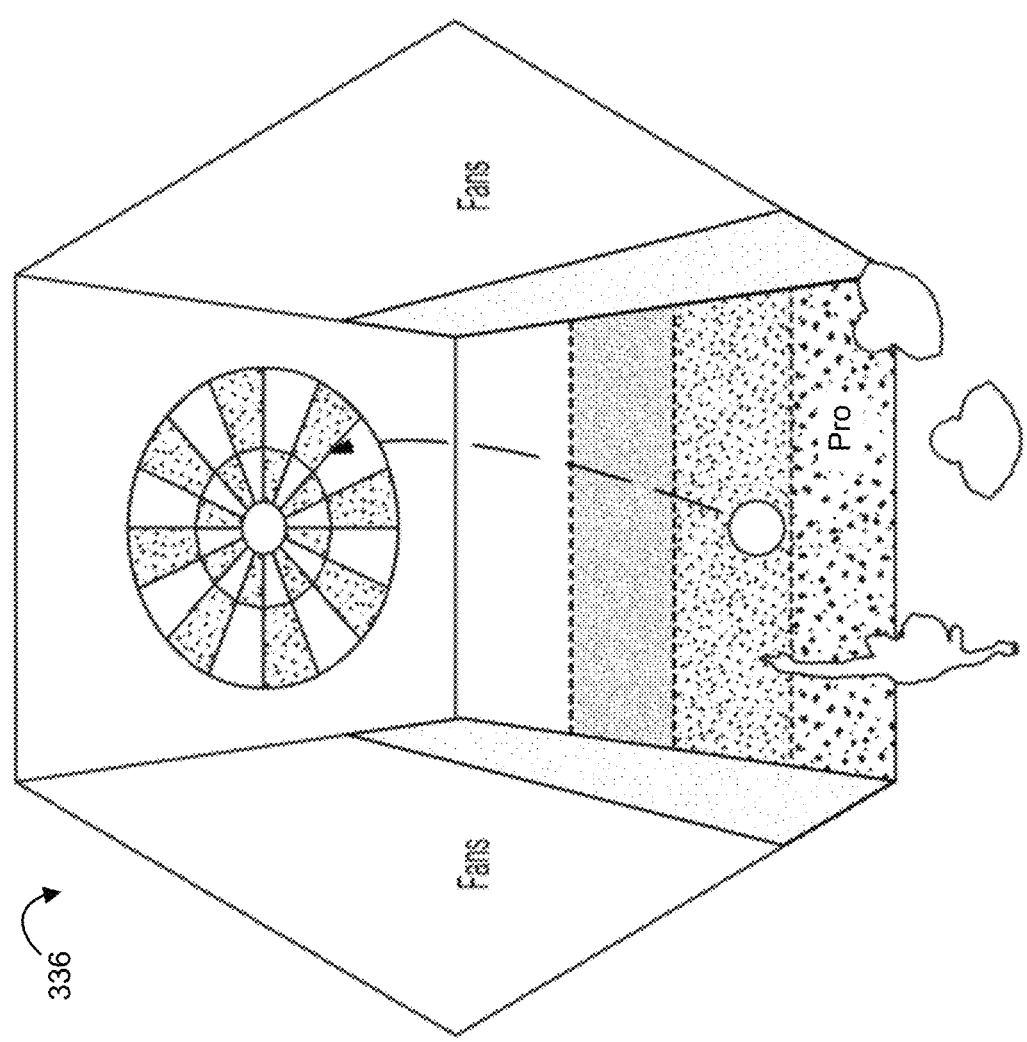
Figure 3N:
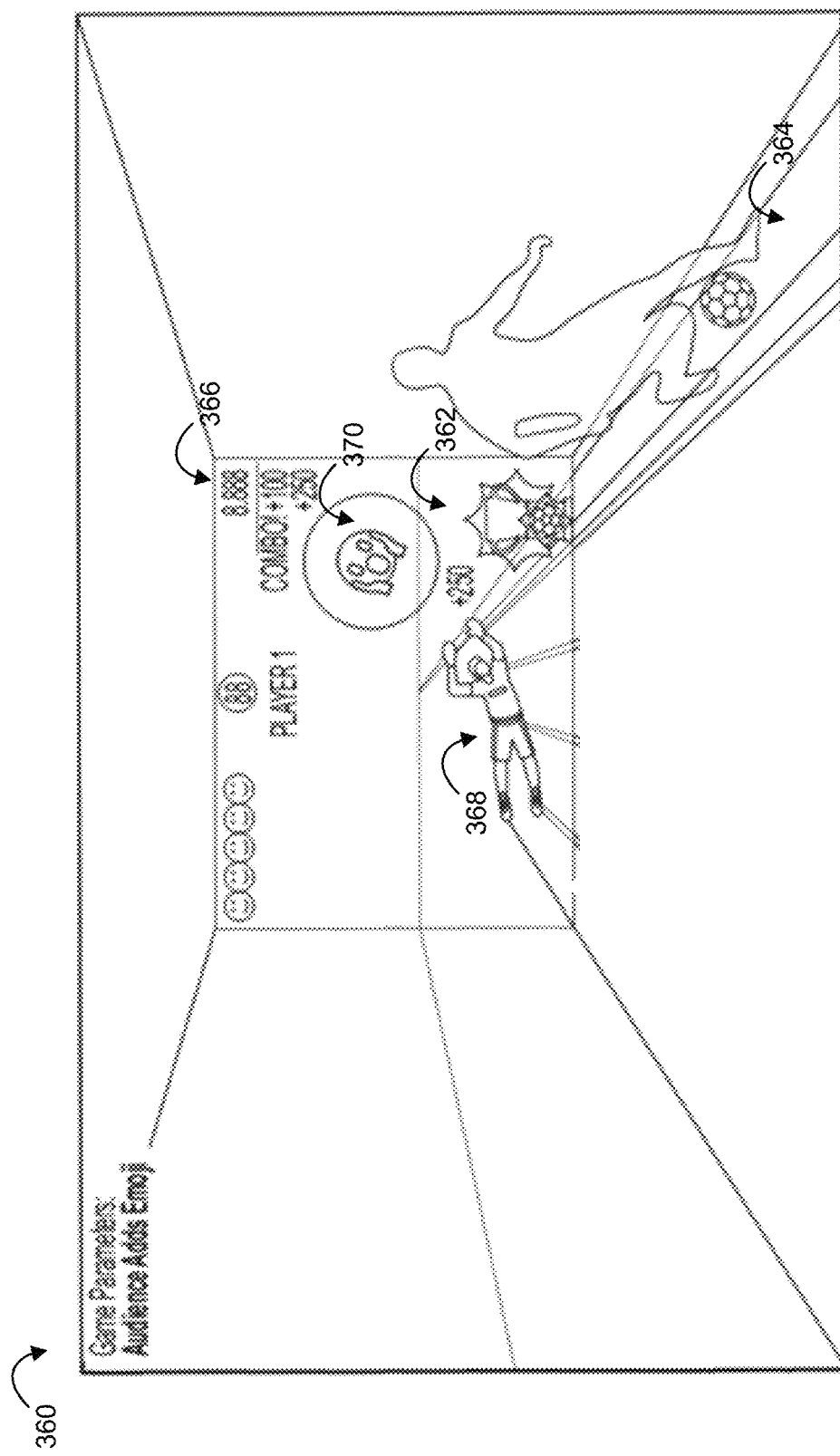
Figure 3O:
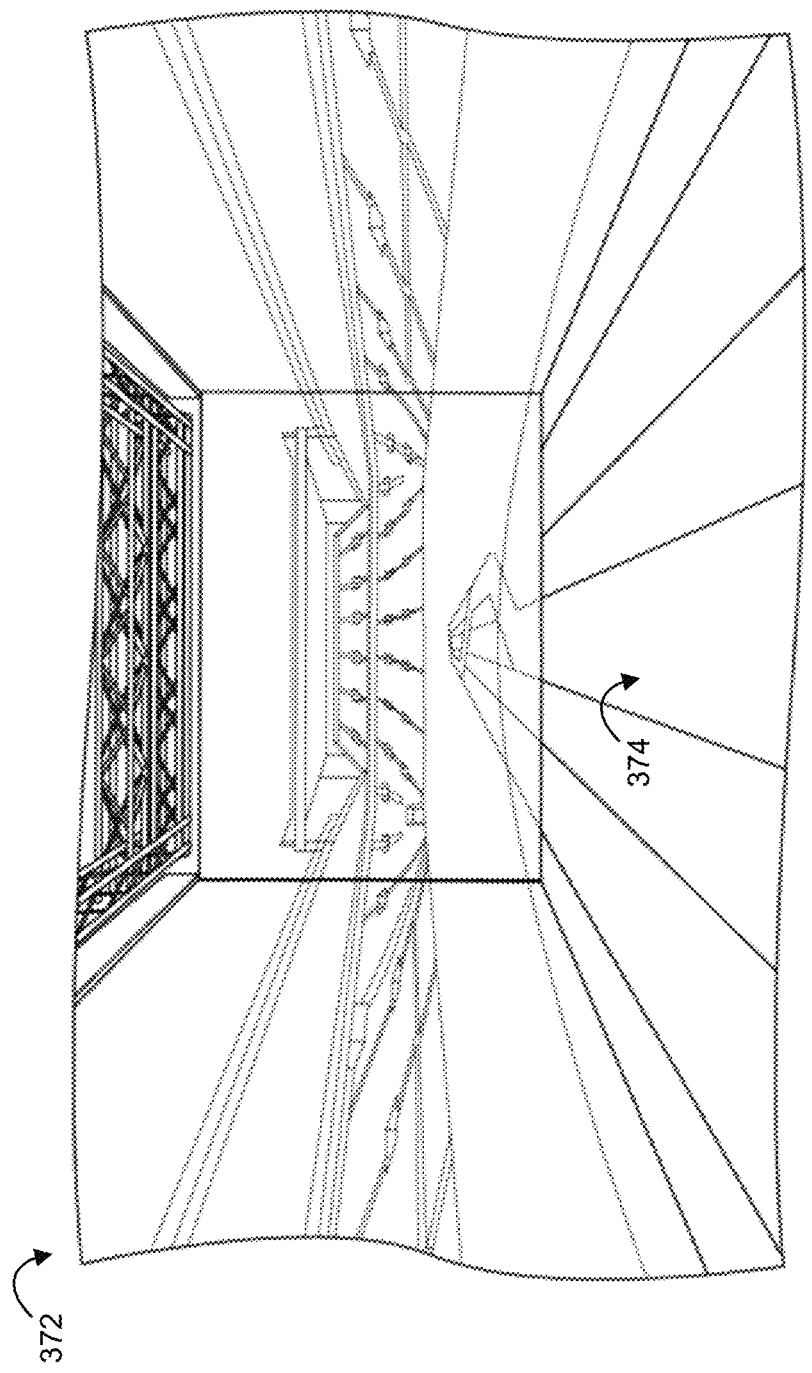

FIGS. 3a-3o illustrate example immersive environments, according to some embodiments. The example immersive environments may be displayed on a majority of the wall surfaces 104 (e.g., wall surfaces 104 of FIGS. 1a-1i) and/or on a floor surface 102 of interactive multimedia structure 100. FIG. 3a illustrates example immersive environments 300, 302, and 304. As illustrated with respect to example immersive environments 300 and 302, a user may manipulate a user input device (e.g., a football) to cause the user input device to interact with a wall surface 104 of the interactive multimedia structure 100. As illustrated with respect to example immersive environment 304, users of the interactive multimedia structure 100 may interact with the immersive environment displayed on separate wall surfaces 104 of the interactive multimedia structure 100, such as in competition with each other. In certain embodiments, multiple users may interact with the immersive environment on the same wall surface 104. In addition, avatars, or virtual representations of user input devices associated with an interactive multimedia structure 100 may be displayed as part of the immersive environment in another interactive multimedia structure 100.

FIG. 3b illustrates an example immersive environment 306 as viewed from a spectator area 108 of interactive multimedia structure 100. The immersive environment 306 may provide, for example, a game or skills challenge where a user attempts to cause a football to interact with a particular portion 308 of the immersive environment. The immersive environment may provide a visual continuation of portions of the interactive multimedia structure 100. For example, if the floor surface 102 in the interactive multimedia structure 100 comprises turf, the immersive environment displayed on the wall surfaces 104 of the interactive multimedia structure 100 may provide a visual continuation of the turf.

FIG. 3c illustrates an example immersive environment 310. The immersive environment 310 may provide a skills or accuracy challenge, where the area "B" displayed on one wall surface 104 of the interactive multimedia structure 100 is reduced overtime or based on successful interaction of a user input device with the area "B." This modification of the area "B" is illustrated over time by the arrow at 312. As further illustrated in FIG. 3c by the "River Area," other aspects of the immersive environment may be displayed on a floor surface 102 of the interactive multimedia structure 100 and may be a part of the skills or accuracy challenge. In this example, the "River Area" may be an area over which a user of the interactive multimedia structure 100 needs to kick a ball from area "A."

FIG. 3d illustrates an example immersive environment 314. Similar to the immersive environment 310 illustrated in FIG. 3c, the immersive environment 314 may include a starting area for a user input device, a target area of interaction of the user input device with the immersive environment, area(s) of the immersive environment with which to avoid interaction of the user input device, and/or the like. For example, the immersive environment 314 may be associated with having the user kick a ball from a starting location "1," trying to hit the area "2," and avoiding interaction with the area "3" or causing the ball to land in the area "3." As illustrated by the arrow at 316, the immersive environment 314 may change over time or as certain areas are successfully interacted with or avoided.

FIG. 3e illustrates an example immersive environments 318 and 320. The immersive environment 318 may include aspects similar to that described elsewhere herein (e.g., target area(s) "A" through "E" on one or more wall surfaces 104 of the interactive multimedia structure 100 and a starting location shown as a "Shooting Area"). The immersive environment 320 illustrates that the target areas may be a combination of stationary and moving in various directions. As illustrated at 322, a user of a user device (e.g., user device 112, 130 in FIGS. 1a-1i) may control parameters for the various target areas, such as location, size, direction of movement, speed of movement, positive or negative point value (for interaction with, or avoidance of, the target area), and/or the like.

FIG. 3f illustrates example immersive environments 324 and 326.

As illustrated in FIG. 3f, immersive environment 324 may provide common target areas for multiple users and immersive environment 326 may provide separate target areas for different users (e.g., where interaction with a user's own target areas may add points to the user's score and interaction with an opposing user's target areas may subtract points from the user's score). In addition, the immersive environments 324 and 326 may include a "Shooting Area" projected on a floor surface 102, from which the users may try to interact with another portion of the immersive environments 324 and 326.

FIG. 3g illustrates example immersive environments 328 and 330. As illustrated, the immersive environment 328 may provide a virtual representation of an object to which the user reacts and interacts with the immersive environment 328. As illustrated at 332, a user of a user device 112, 130 may control display of the virtual object. For example, the user device 112, 130 may display a portion of the immersive environment 328 (e.g., a portion of one of the wall surfaces 104 of the interactive multimedia structure 100), and the user of the user device 112, 130 may cause modifications to the immersive environment through interactions with the user device 112, 130. Similarly, the immersive environment 330 may provide a virtual representation of an object on one portion of the immersive environment 330 based on an interaction in another portion of the immersive environment 330. For example, and as illustrated, the right-most user may interact with the right-most wall surface 104 to identify where on the left-most wall surface 104 a virtual object is to appear (e.g., where the left-most user may have to react to the display of the virtual object, and scoring may be based on this reaction).

FIG. 3h illustrates an example immersive environment 334. As illustrated, at least a portion of the immersive environment 344 may be displayed on a floor surface 102 of the interactive multimedia structure 100. FIG. 3i illustrates an example immersive environment 336. The immersive environment 336 may provide a gradient of skill levels for starting locations in a multimedia experience (e.g., where the "Pro" level may represent the most difficult level). As additionally illustrated, the immersive environment 336 may include spectators (shown as "Fans" on the side wall surfaces 104). For example, the spectators may include avatars of other users of the interactive multimedia structure 100, images of a live audience (e.g., in the spectator area 108 or in another location), stock images, and/or the like. As further illustrated, the immersive environment 336 may provide a turn-based game. The example of FIG. 3i illustrates a darts-style game where users may take turns trying to score points on a dartboard. In some alternatives (as discussed below), remote users may be able to participate in exhibition matches with "Pro" level users located at the interactive media structure 100.

FIG. 3j illustrates an example immersive environment 338. The immersive environment 338 may include virtual panels or other portions 340 that may be provided from a background to a foreground of the virtual environment. For example, a portion of the immersive environment 338 may include a level of a game displayed within the immersive environment 338. After completion of the level, a new level may be displayed within the immersive environment 338 without changing the environmental elements of the immersive environment 338.

FIG. 3k illustrates an example immersive environment 342. As illustrated at 344, a spectator may be displayed in a portion of the immersive environment. For example, the spectator may be a virtual coach or an image of a non-virtual coach (e.g., that may be a live image of an individual in another location). Additionally, or alternatively, there may be a virtual persona in the immersive environment (e.g., as a projection or a hologram). Additionally, or alternatively, there may be a hologram, android or robot, and the like (collectively "virtual persona") in the interactive multimedia structure 100 that can interact with the users of the interactive multimedia structure 100 through sensors, cameras, microphones, speakers, and/or the like. These virtual personas may be present in an interactive structure and may take on a variety of roles required to support the interactive structure's customers, including tour guide, concierge, waiters, sales clerk, service delivery, or other roles required to support the interactive structure. These virtual personas may take on the real appearance of any person (alive or dead) or be a completely fictitious person, e.g. Sherlock Holmes. In some alternatives, the virtual persona appearance may be selected based on the appearance of a real or fictitious person that is related to the theme of the immersive environment. Additionally, or alternatively, these virtual personas may also be represented as Avatars in the immersive environment 346. For example, in a soccer themed multimedia experience, the virtual persona may be a football star like David Beckham, Pele or Diego Maradona providing guidance, coaching, or otherwise engage with a user, which may improve their performance. In another example, for a basketball themed multimedia experience, Yao Ming, Michael Jordan or Kobe Bryant may provide guidance, coaching tips or otherwise engage with a user, which may improve their performance. FIG. 3l illustrates an example immersive environment 346. The immersive environment 346 may include, as illustrated at 348, portions that are displayed on a floor surface 102 of the interactive multimedia structure 100. The displayed portions may identify areas where user(s) have to be located or areas where the user(s) are restricted from being located.

FIG. 3m illustrates example immersive environments 350, 352, and 354. The immersive environment 350 illustrates an immersive environment that incorporates elements similar to that described above. The immersive environment 352 illustrates, at 356, that portions of an immersive environment may be displayed on a wall surface 104 and on a floor surface 102. In this case, the portions displayed on the wall surface 104 may include visual extensions of the portions displayed on the floor surface 102. For example, this may allow for the creation the illusion of depth in the immersive environment 352, so that elements of the immersive environment 352 can be displayed from the background of the immersive environment 352 to the foreground and/or to a location on the floor surface 102, or vice versa. The immersive environment 354 may include, as illustrated at 358, portions of the immersive environment 354 displayed on a wall surface 104 and on the floor surface 102. Unlike the immersive environment 352, the portions of the immersive environment 354 may not be extensions of each other and may provide different aspects of a multimedia experience (e.g., starting locations may be displayed on the floor surface 102 and target locations for interaction of a user input device may be displayed on the wall surface 104), as described in more detail elsewhere herein.

FIG. 3n illustrates an example immersive environment 360. The immersive environment 360 may incorporate various aspects described elsewhere herein, as well as additional aspects. For example, portions of the immersive environment 360 may be displayed on wall surfaces 104 and the floor surface 102 of the interactive multimedia structure 100. The immersive environment 360 may include target areas 362 for interaction of a user input device with the immersive environment 360, a target area 364 for the user to be located, metrics 366 related to points scored or penalties, avatars 368 of characters associated with a multimedia experience, emoticons 370 related to the multimedia experience and/or user actions, and/or the like. In the case of metrics, the interactive multimedia structure 100 may provide a leader board for display as part of the immersive environment. The leader board may provide a ranking of users across different interactive multimedia structures 100 over a time period, metrics for those users, highlight reels of those users, and/or the like.

In some embodiments, the interactive multimedia structure 100 may utilize a variety of protocols to identify multimedia experience events for including in a highlight reel. The interactive multimedia structure 100 may store a highlight criterion for a multimedia experience to mark a highlight event in the multimedia experience. The interactive multimedia structure 100 may play a recorded session of the multimedia experience. The interactive multimedia structure 100 may identify an event in the recorded session that matches the highlight criterion. A user may make a highlight reel of the most exciting segments of the multimedia experience. The interactive multimedia structure 100 may trigger an application programming interface to mark the event during a multimedia experience as a highlight event for inclusion in a highlight reel presenting highlight events from the recorded session. For example, a computer or a user of the interactive multimedia structure 100 may record the user's interaction with the immersive environment and may select portions of the interaction to include in a highlight reel. Continuing with the previous example, portions of the recording of the interactions may be selected for inclusion in the highlight reel based on the user completing a difficult portion of a game, scoring a certain number of points toward a total score in an amount of time, reaching a certain level of a game, spectator reactions (e.g., input of comments, input of a command to display an emoji or a particular type of emoji, or the like), input from a user of a user device 112, 130, and/or the like. In some alternatives, the interactive multimedia structure 100 may use metadata describing interactions of the spectators 502 with a user session on the interactive multimedia structure 100 to identify highlight events. The interactive multimedia structure 100 may quantify spectator 502 interaction using the number of comments posted within a set period of time on a comment module or on social media using a session identifier for a multimedia experience session. In some alternatives, the interactive multimedia structure 100 may utilize machine learning to analyze the actions and facial expressions of the user during a multimedia experience session to identify highlight events.

FIG. 3o illustrates an example immersive environment 372. The immersive environment 372 may incorporate various aspects described elsewhere herein. For example, the immersive environment 372 may include a target area 374 for a location of a user of the interactive multimedia structure 100. Additionally, or alternatively, portions of the immersive environment 372 may be displayed on one or more wall surfaces 104 and on the floor surface 102. As further illustrated, portions of the immersive environment 372 may include real-life images (e.g., of a stadium), with other virtual portions of the immersive environment 372 overlain on the images. For example, the target area 374 may be overlain on the real images. In certain embodiments, both the real-life images and the virtual portions may be modified based on interactions of a user input device with the immersive environment 372, movement of the user, and/or the like. For example, if the user input device is moved in one direction (or interacts with a particular wall surface 104), the display of the immersive environment 372 may be modified to a vantage point in that direction. The same modification may be performed based on movement of the user.

As described above, FIGS. 3a-3o are provided as examples. Other examples are possible, according to some embodiments.

Figure 4A:
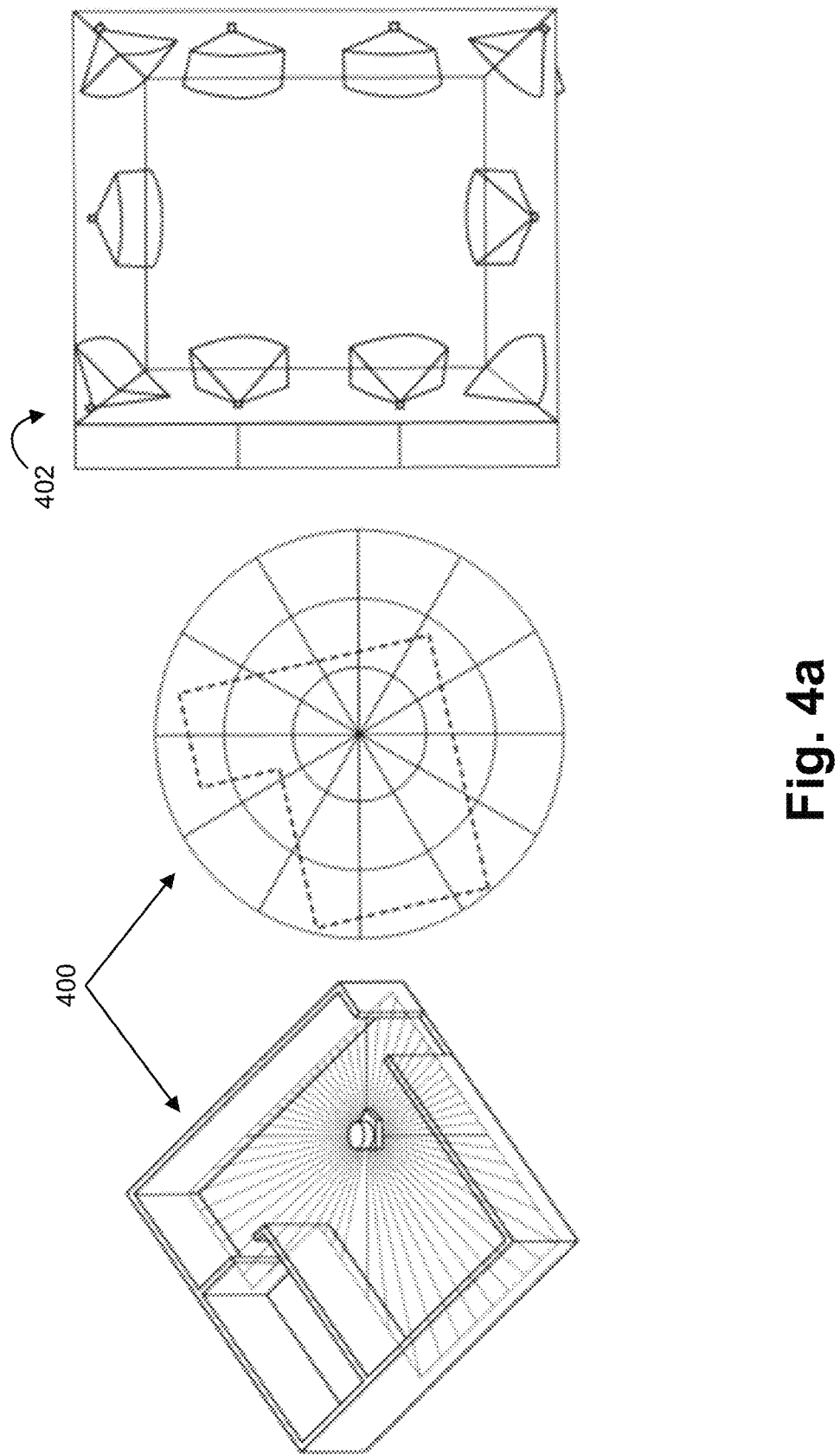
FIGS. 4*a* and 4*b* illustrate various examples of user input device tracking, according to some embodiments.
Figure 4B:
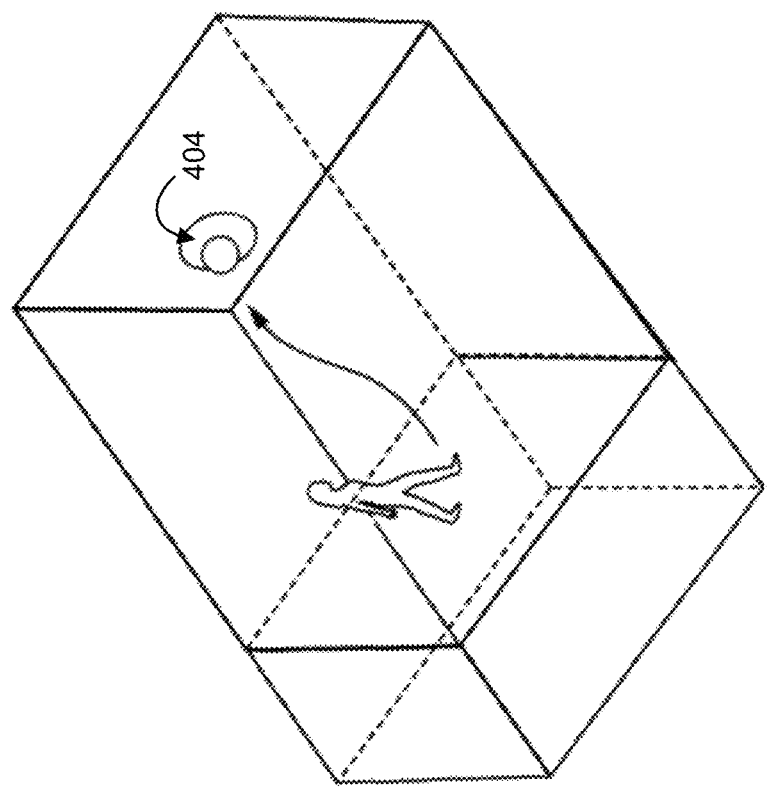

FIGS. 4a and 4b illustrate various examples of user input device tracking, according to some embodiments. As described elsewhere herein, the interactive multimedia structure 100 may be associated with a tracking system. For example, the tracking system may include one or more computing devices (e.g., one or more apparatuses 10 of FIG. 8). The tracking system may track an interaction of a user with one or more user input devices and/or an interaction of the one or more user input devices with an immersive environment. For example, the one or more computing devices of the tracking system may include, as illustrated at 400, one or more light detection and radar (LiDAR) devices. Additionally, or alternatively, as another example, the tacking system may include one or more motion capture devices, as illustrated at 402.

LiDAR devices may provide a lower price point, may provide easier calibration, may provide a reduced need for on-going calibration, and may not need customized user input devices. Motion capture devices may allow for mapping of a marked user input device in three-dimensional space, may provide more accurate data for speed and/or angle of interaction with an immersive environment, may provide for enhanced tracking when a user and a user input device are in close proximity, may provide for improved tracking of multiple users and/or user input devices, and/or the like. FIG. 4b illustrates an example of the tracking system that may track an interaction of a user input device (e.g., a ball, hockey stick or puck, racquet, wearable device, a sword, a gun shaped controller, a steering wheel or other physical device that corresponds to the available content)

interacting with an immersive environment through contact with a wall surface 104, as illustrated at 404.

Other methods of tracking an object and/or a user associated with the interactive multimedia structure 100 may be used in connection with the embodiments described herein. For example, walls of the interactive multimedia structure 100 may be configured with sensors (e.g., pressure sensors, RFID sensors, and/or the like) to detect interaction of a user input device with the wall.

As described above, FIGS. 4a and 4b are provided as an example. Other examples are possible, according to some embodiments.

Figure 5A:
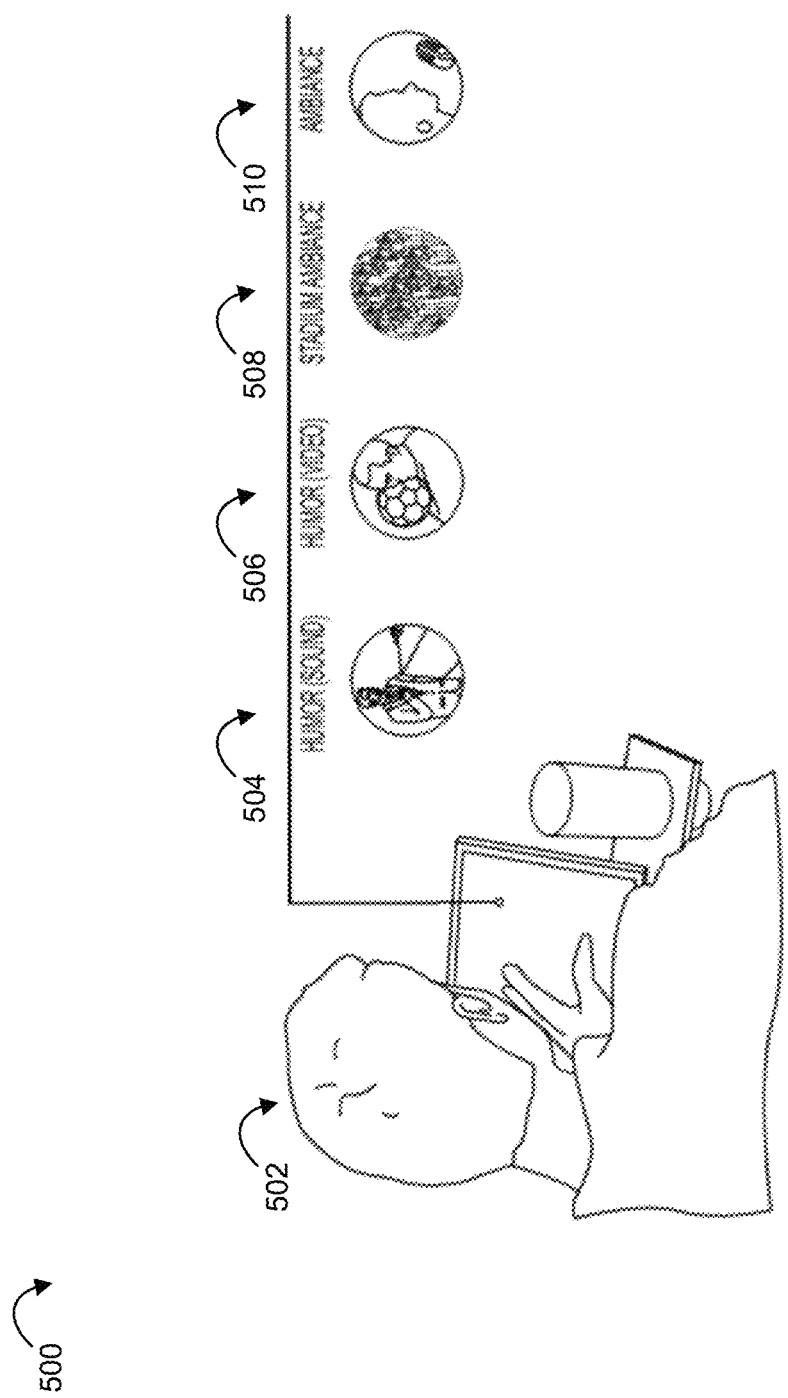
FIGS. 5*a*-5*c* illustrate various examples of user control of certain systems, according to some embodiments.
Figure 5B:
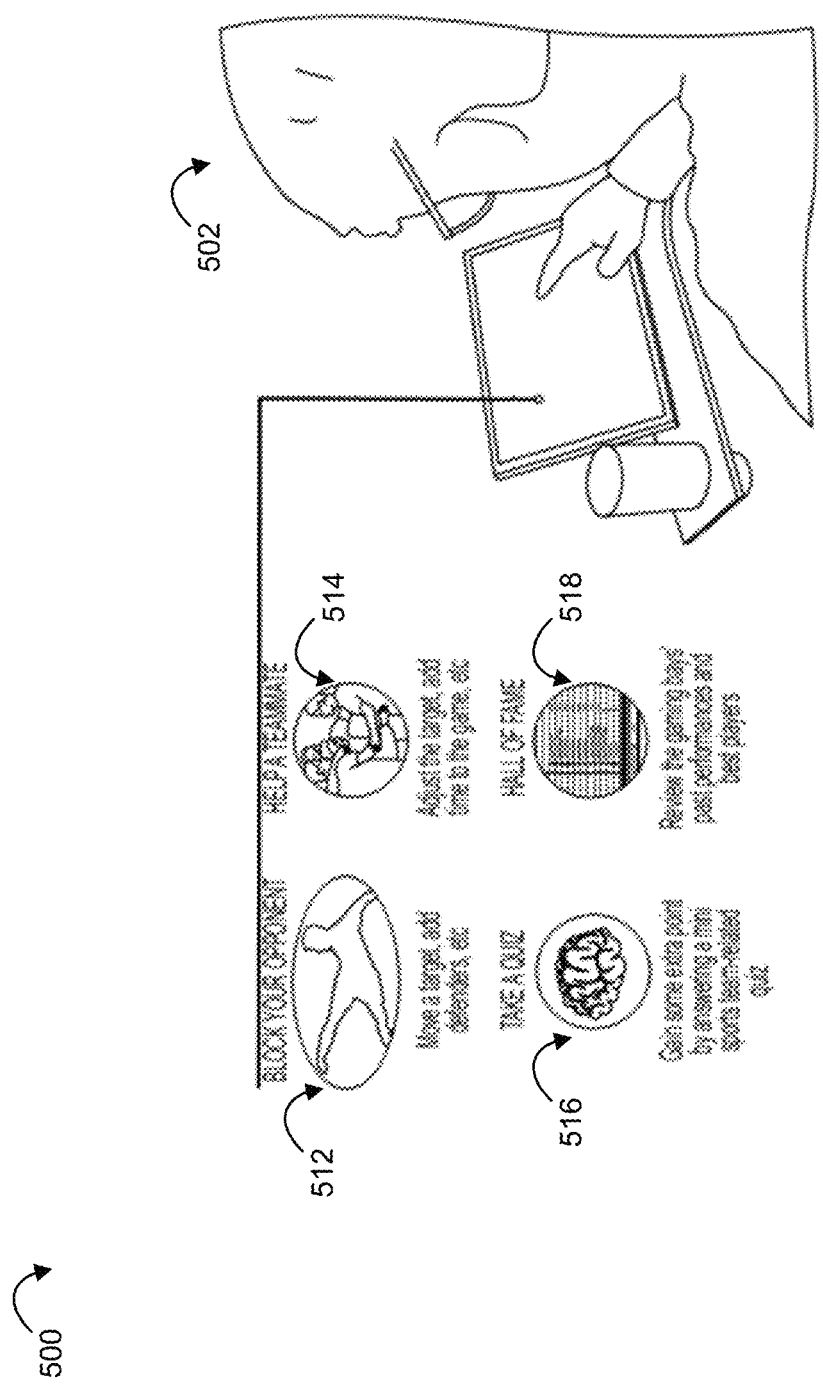
Figure 5C:
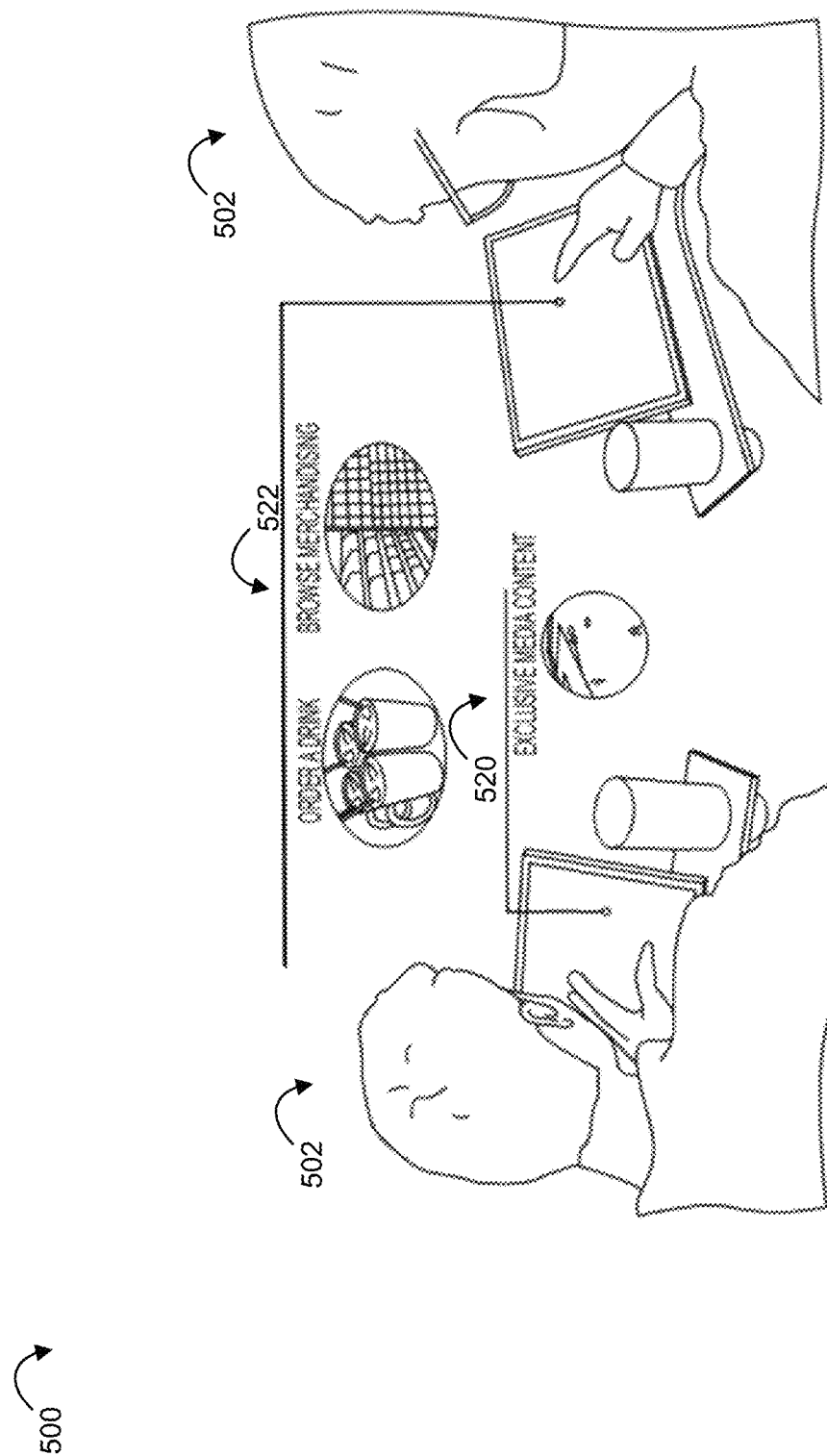

FIGS. 5a-5c illustrate various examples 500 of user control of certain systems, according to some embodiments. As illustrated in FIG. 5a at 502, a user (e.g., in a spectator area 108) may, through a user device 112, 130, control the interactive multimedia structure 100 and/or an immersive environment. For example, and as illustrated at 504, 506, 508, and 510, the user may control sound, video, immersive environment ambiance (e.g., stadium ambiance of a stadium that is displayed), and/or interactive multimedia structure 100 ambiance. FIG. 5b illustrates, at 512, 514, 516, and 518, additional examples of control of the interactive multimedia structure 100 and/or immersive environment. For example, the user may control a character or a target in a game, may provide help to a user playing a game, may participate in other multimedia experiences, such as a quiz, may view scores related to a game, and/or the like. FIG. 5c illustrates multiple spectators of a multimedia experience or users of an interactive multimedia structure 100 where, at 520, a user may access multimedia content (e.g., multimedia content associated with a brand, a sport, a location, etc.) through a user device 112, 130. At 522, the user may access user services provided within an interactive housing structure 124. For example, the user services may include browsing and/or ordering food and/or beverages, browsing and/or purchasing merchandise, requesting assistance and/or the like.

As described above, FIGS. 5a-5c are provided as examples. Other examples are possible, according to some embodiments.

FIG. 6 illustrates an example flow diagram of a method 600, according to some embodiments. For example, FIG. 6 may illustrate example operations of one or more computing devices (e.g., one or more apparatuses 10 illustrated in, and described with respect to, FIG. 8). In particular, the method 600 may illustrate operations of one or more computing devices of a multimedia output system or a tracking system. These systems may be associated with an interactive multimedia structure 100 that comprises a floor surface 102 or a plurality of wall surfaces 104. Some of the operations illustrated in FIG. 6 may be similar to some operations shown in, and described with respect to, FIGS. 1a-5c.

In an embodiment, the method may include, at 602, outputting one or more two-dimensional images on a majority of the plurality of wall surfaces 104 to create an immersive environment. The immersive environment may comprise one or more virtual objects (e.g., virtual objects with which a user input device is to interact) and one or more virtual environmental elements (e.g., a background of the immersive environment). The method may include, at 604, tracking the one or more users interaction with the one or more user input devices within the interactive media structure 100. The method may include, at 606, modifying output of the one or more virtual objects based on the interaction.

The method illustrated in FIG. 6 may include one or more additional aspects described below or elsewhere herein. The interactive multimedia structure 100 may further comprise a scoring system that is associated with computing one or more metrics based on tracking the one or more users interaction with the one or more input devices. The one or more metrics may comprise a reward, a penalty, a skill level, a success or failure rate, or a biometric.

The interactive multimedia structure 100 may further comprise a user input system associated with controlling the interactive multimedia structure 100, accessing one or more user services associated with the interactive multimedia structure 100, or accessing information related to use of the interactive multimedia structure 100. The user input system may be accessible through one or more user devices 112, 130 of the interactive multimedia structure 100 or may be accessible through an application 128 installed on user devices 112, 130 of the one or more users.

The interactive multimedia structure 100 may be connected, via a network, with one or more other interactive multimedia structures 100. The one or more other interactive multimedia structures 100 may be located within a same interactive housing structure 124 as the interactive multimedia structure 100, located in one or more interactive housing structures 124 that different from that of the interactive multimedia structure 100, located at a same location as the interactive multimedia structure 100, or located across one or more different locations from the interactive multimedia structure 100. The one or more users interactions may cause one or more modifications in one or more immersive environments of the one or more other interactive multimedia structures 100.

The interactive multimedia structure 100 may be associated with one or more computing devices that receive interaction information. The interaction information may be related to the one or more users interaction. The interactive multimedia structure 100 may process the interaction information using a machine learning model to identify one or more characteristics of the interaction information (e.g., a characteristic may include a speed of the interaction, an accuracy of the interaction, and/or the like). The interactive multimedia structure 100 may determine, using the machine learning model, one or more modifications to the immersive environment based on the identified one or more characteristics (e.g., a modification may include a change to a size, a speed, or a location of a virtual object). The machine learning model may be trained based on other interaction information. The interactive multimedia structure 100 may output the determined one or more modifications to the multimedia output system.

The multimedia output system may configure the immersive environment based on profiles of the one or more users (e.g., based on a skill level of the users, based on a last level of a game completed, and/or the like). The multimedia output system may stream a multimedia feed of the immersive environment and/or the interactions to one or more displays. The immersive environment may further comprise avatars of the one or more users. The tracking system may comprise one or more light distance and ranging devices or one or more motion capture devices. The tracking may be performed based on a color of the one or more user input devices, a reflectivity of the one or more user input devices, a size of the one or more user input devices, or a shape of the one or more user input devices. The immersive environment may further comprise one or more virtual representations of the one or more user input devices. The multimedia output system may output the one or more two-dimensional images on the floor surface 102.

The interactive multimedia structure 100 may be associated with an interactive housing structure 124 (e.g., a smart building) along with one or more other interactive multimedia structures 100. The interactive housing structure 124 may include a plurality of user services within the interactive housing structure 124. The interactive housing structure 124 may further comprise one or more sensors positioned within the interactive housing structure 124. The sensors may receive instructions from a plurality of mobile devices sending requests to the one or more of the plurality of user services or the at least one interactive multimedia structure 100. The one or more sensors may provide a response associated with the received instructions from the plurality of mobile devices. The plurality of user services may comprise a retail service, a food service, an experience customization service, or a profile retrieval service.

As described above, FIG. 6 is provided as an example. Other examples are possible according to some embodiments.

FIG. 7 illustrates an example flow diagram of a method 700, according to some embodiments. For example, FIG. 7 may illustrate example operations of one or more computing devices (e.g., one or more apparatuses 10 illustrated in, and described with respect to, FIG. 8). The one or more computing devices may be associated with an interactive multimedia structure 100 and/or an interactive housing structure 124. Some of the operations illustrated in FIG. 7 may be similar to some operations shown in, and described with respect to, FIGS. 1a-5c.

In an embodiment, the method may include, at 702, receiving interaction information. The interaction information may be related to an interaction of one or more users with one or more user input devices within a structure that provides an immersive environment. The immersive environment may comprise one or more virtual objects and one or more virtual environmental elements. The immersive environment may be displayed on a majority of a plurality of wall surfaces 104 of the structure to create the immersive environment. The method may include, at 704, processing the interaction information using a machine learning model to identify one or more characteristics of the interaction information. The method may include, at 706, determining, using the machine learning model, one or more modifications to the immersive environment based on the identified one or more characteristics. The machine learning model may be trained based on other interaction information. The method may include, at 708, outputting the determined one or more modifications to a multimedia output system.

The method illustrated in FIG. 7 may include one or more additional aspects described below or elsewhere herein. The one or more characteristics may comprise a location of the interaction relative to the immersive environment, a speed of the interaction, an accuracy of the interaction, or success or failure of the interaction. The one or more modifications may be related to a size of the one or more virtual objects, a speed of the one or more virtual objects, a location of the one or more virtual objects, or a quantity of the one or more objects. The multimedia output system may output the immersive environment. The interaction information may be gathered by a tracking system associated with the structure. The structure may be connected, via a network, with one or more other structures in a same location as the structure or one or more other locations different from the structure.

As described above, FIG. 7 is provided as an example. Other examples are possible according to some embodiments.

Figure 8:
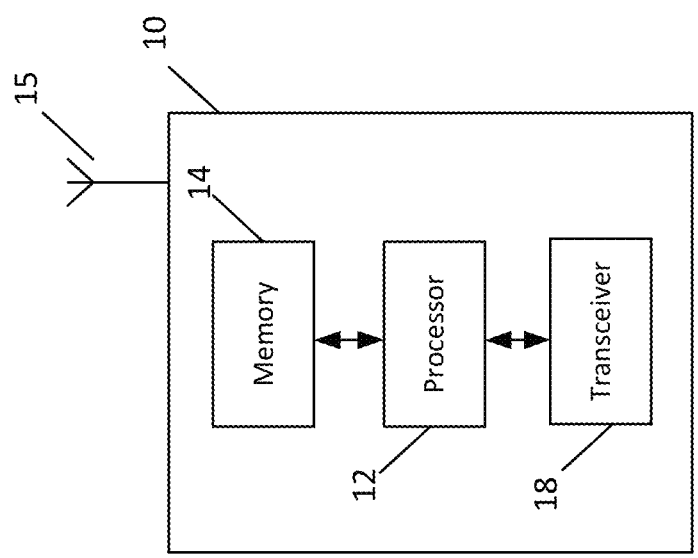
FIG. 8 illustrates an example block diagram of an apparatus, according to an embodiment.

FIG. 8 illustrates an example of an apparatus 10 according to an embodiment. In an embodiment, apparatus 10 may be a node, host, or server in a communications network or serving such a network. For example, apparatus 10 may be user device (e.g., a user device 112, 130, such as a laptop or desktop computer, a surface computer, a stationery game table, a mobile phone, a tablet, or a wearable device), a user input device, a sensor, or a computing device (e.g., of a system described herein). One or more apparatuses 10 may be connected via a wired network, a wireless network, or a combination of wired and wireless networks.

As illustrated in the example of FIG. 8, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10.

Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a user device, a user input device, a computing device, or a sensor.

According to certain embodiments, apparatus 10 may be controlled by memory 14 and processor 12 to perform the functions associated with any of the embodiments described herein, such as some operations illustrated in, or described with respect to, FIGS. 1-8. For instance, apparatus 10 may be controlled by memory 14 and processor 12 to perform the methods of FIGS. 6-8.

In some embodiments, an apparatus (e.g., apparatus 10) may include means for performing a method or any of the variants discussed herein, e.g., a method described with reference to FIG. 6-8. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is provisioning of an immersive environment with which a user can interact using a user input device, which may provide for an enhanced multimedia experience. Accordingly, the use of some example embodiments results in improved functioning of communications networks and their nodes and, therefore constitute an improvement at least to the technological field of multimedia provisioning, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

In another embodiment, when the interactive multimedia structure 100 is unoccupied or idle, it may be configured to receive and display digital content (e.g., display live video streams, advertisements, logos, trailers, or other digital content that are transferred over a computer network). The digital content may additionally be displayed as part of an immersive environment. In some alternatives, the digital content may be stored in a dedicated database. In some alternatives, when needed, the interactive multimedia structure 100 may be able to query the database for the appropriate digital content to be displayed by the interactive multimedia structure 100. What digital content is chosen can be based on a number of different factors. For example, a user's profile may be used to select types of digital content a particular user may be interested in viewing. In another example, interactions with mobile devices of users in the interactive housing structure 124 may be used to select types of digital content. In a further example, the theme of the interactive housing structure 124, user biometrics or other instructions received from the owner of the interactive housing structure 124 or third party partners may be used to select types of digital content. In some alternatives, the received content may be displayed on one wall surface 104. In some alternatives, the received content may be displayed on a plurality of the wall surfaces 104. In some alternatives, the digital content may be used to facilitate monetization. In another embodiment, while the interactive multimedia structure 100 is in use or during a multimedia experience, a separate client software may be executed within the multimedia experience. This software may be in direct contact, over a network with the dedicated database. This software may create a window within the multimedia experience, and may act as a mask or matte upon which digital content using any of the above selection factors may be streamed.

In another embodiment, the multimedia experience from one or more interactive multimedia structures 100 may be transferred to a conventional video game live streaming platform and streamed to an audience within the interactive housing structure 124 or to remote users. Commentary may be added to the transferred multimedia experience, for example, from the spectators 502 using their user devices 112, 130. In another alternative, one or more authenticated remote users on their computing devices may be capable of assuming a commentary role for the transferred multimedia experience.

In another embodiment, the interactive multimedia structure 100 may facilitate a betting or wagering system. For example, users of the interactive multimedia structure 100 may be able to create a bet based on game play. In some alternatives, the interactive multimedia structure 100 may include leagues, friends lists, private and public customization, a bettor ranking system, frequent player point program, chat channels, mini-leagues and a real-time bettor program.

In another embodiment, biometric data may be captured from a user engaging with the multimedia experience in the interactive multimedia structure 100. For example, the user may use a wearable device to capture this biometric data. In some alternatives, an observation equipment located within the interactive multimedia structure 100 may be trained on the user. For example, the biometric data captures may include, heart rate, galvanic skin responses, Electroencephalogram, eye tracking or other types of conventional biometric data. In some alternatives, the captured biometric data may be shared with the spectators 502. In some alternatives, the captured biometric data may provide insights to the user's experience with the multimedia experience or the interactive multimedia structure 100. In some alternatives, the captured biometric data may be used to improve the user's future experience with the multimedia experience or the interactive multimedia structure 100. In some alternatives, the interactive multimedia structure 100 may quantify a user's excitement levels using a biometric characteristic captured from the biometric data to determine multimedia experience events of interest.

Although certain embodiments have been described in the context of sporting or gaming multimedia experiences, the embodiments described herein can be applied in other contexts. For example, certain embodiments may be adapted for uses in therapeutic treatment, such as physical therapy, meditation, and/or the like.

Example embodiments described herein apply equally to both singular and plural implementations, regardless of whether singular or plural language is used in connection with describing certain embodiments. For example, an embodiment that describes operations of a single computing device equally applies to embodiments that include multiple instances of the computing device, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:
1. An interactive multimedia structure, comprising:
a floor surface,
a plurality of physical wall surfaces,
a multimedia output system, wherein the multimedia output system comprises the plurality of physical wall surfaces,
one or more user input devices, and
a tracking system, wherein the multimedia output system and the tracking system perform at least the following:
output, by the multimedia output system, one or more two-dimensional images on a majority of the plurality of physical wall surfaces and the floor surface to create an immersive environment, wherein the immersive environment comprises one or more virtual objects and one or more virtual environmental elements;
track, by the tracking system, the one or more users interaction with the one or more user input devices, and the one or more user input device's physical interaction with the plurality of physical wall surfaces and the floor surface, within the interactive multimedia structure; and
modify, by the multimedia output system, output of the one or more virtual objects based on the interaction, and wherein the interactive multimedia structure is associated with one or more computing devices that perform at least the following:
receive interaction information, wherein the interaction information is related to the one or more users interaction;

process the interaction information using a machine learning model to identify one or more characteristics of the interaction information;

determine, using the machine learning model, one or more modifications to the immersive environment based on the identified one or more characteristics, wherein the machine learning model is trained based on other interaction information, and wherein the machine learning model is trained based on past characteristics of the interaction information corresponding to data related to past uses of the interactive multimedia structure by the one or more users; and output the determined one or more modifications to the multimedia output system.

2. The interactive multimedia structure according to claim 1, wherein the interactive multimedia structure further comprises a scoring system that is associated with computing one or more metrics based on tracking the one or more users interaction with the one or more input devices, wherein the one or more metrics comprise a reward, a penalty, a skill level, a success or failure rate, or a biometric.

3. The interactive multimedia structure according to claim 1, wherein the interactive multimedia structure further comprises a user input system associated with controlling the interactive multimedia structure, accessing one or more user services associated with the interactive multimedia structure, or accessing information related to use of the interactive multimedia structure.

4. The interactive multimedia structure according to claim 3, wherein the user input system is accessible through one or more user devices of the interactive multimedia structure or is accessible through an application installed on user devices of the one or more users.

5. The interactive multimedia structure according to claim 1, wherein the interactive multimedia structure is connected, via a network, with one or more other interactive multimedia structures.

6. The interactive multimedia structure according to claim 5, wherein the one or more other interactive multimedia structures are:

located within a same interactive housing structure as the interactive multimedia structure, located in one or more interactive housing structures that different from that of the interactive multimedia structure, located at a same location as the interactive multimedia structure, or located across one or more different locations from the interactive multimedia structure.

7. The interactive multimedia structure according to claim 6, wherein the one or more users interactions cause one or more modifications in one or more immersive environments of the one or more other interactive multimedia structures.

8. The interactive multimedia structure according to claim 1, wherein the multimedia output system configures the immersive environment based on profiles of the one or more users.

9. The interactive multimedia structure according to claim 1, wherein the multimedia output system streams a multimedia feed of the immersive environment and/or the interactions to one or more displays.

10. The interactive multimedia structure according to claim 1, wherein the immersive environment further comprises avatars of the one or more users.

11. The interactive multimedia structure according to claim 1, wherein the tracking system comprises one or more light distance and ranging devices or one or more motion capture devices.

12. The interactive multimedia structure according to claim 1, wherein the tracking is performed based on a color of the one or more user input devices, a reflectivity of the one or more user input devices, a size of the one or more user input devices, or a shape of the one or more user input devices.

13. The interactive multimedia structure according to claim 1, wherein the immersive environment further comprises one or more virtual representations of the one or more user input devices.

14. The interactive multimedia structure according to claim 1, wherein the multimedia output system outputs the one or more two-dimensional images on the floor surface.

15. An interactive housing structure, comprising:

at least one interactive multimedia structure, wherein each interactive multimedia structure comprises:

a floor surface, a plurality of physical wall surfaces, a multimedia output system, wherein the multimedia output system comprises the plurality of physical wall surfaces, one or more user input devices, and a tracking system, wherein the multimedia output system and the tracking system perform at least the following:

output, by the multimedia output system, one or more two-dimensional images on a majority of the plurality of physical wall surfaces and the floor surface to create an immersive environment, wherein the immersive environment comprises one or more virtual objects and one or more virtual environmental elements;

track, by the tracking system, the one or more users interaction with the one or more user input devices, and the one or more user input device's physical interaction with the plurality of physical wall surfaces and the floor surface, within the interactive multimedia structure; and modify, by the multimedia output system, output of the one or more virtual objects based on the interaction, a plurality of user services located within the interactive housing structure; and one or more sensors positioned within the interactive housing structure configured to:

receive instructions from a plurality of mobile devices sending requests to the one or more of the plurality of user services or the at least one interactive multimedia structure, and provide a response associated with the received instructions from the plurality of mobile devices, and wherein the at least one interactive multimedia structure is associated with one or more computing devices that perform at least the following:

receive interaction information, wherein the interaction information is related to the one or more users interaction;

process the interaction information using a machine learning model to identify one or more characteristics of the interaction information;

determine, using the machine learning model, one or more modifications to the immersive environment based on the identified one or more characteristics, wherein the machine learning model is trained based on other interaction information, and wherein the machine learning model is trained based on past characteristics of the interaction information corresponding to data related to past uses of the interactive multimedia structure by the one or more users; and output the determined one or more modifications to the multimedia output system.

16. The interactive housing structure according to claim 15, wherein the plurality of user services comprise a retail service, a food service, an experience customization service, or a profile retrieval service.

17. The interactive housing structure according to claim 15, wherein the at least one interactive multimedia structure further comprises a scoring system that is associated with computing one or more metrics based on tracking the one or more users interaction with the one or more input devices, wherein the one or more metrics comprise a reward, a penalty, a skill level, a success or failure rate, or a biometric.

18. The interactive housing structure according to claim 15, wherein the at least one interactive multimedia structure further comprises a user input system associated with controlling the at least one interactive multimedia structure, accessing the plurality of user services associated with the at least one interactive multimedia structure, or accessing information related to use of the at least one interactive multimedia structure.

19. The interactive housing structure according to claim 18, wherein the user input system is accessible through one or more user devices of the at least one interactive multimedia structure or is accessible through an application installed on user devices of the one or more users.

20. The interactive housing structure according to claim 15, wherein the one or more users interactions in one or more of the at least one interactive multimedia structure cause one or more modifications in one or more immersive environments of the at least one interactive multimedia structure or of the one or more other interactive multimedia structures.

21. The interactive housing structure according to claim 15, wherein the at least one multimedia output system configures the immersive environment based on profiles of the one or more users.

22. The interactive housing structure according to claim 15, wherein the multimedia output system streams a multimedia feed of the immersive environment and/or the interactions to one or more displays.

23. A device, comprising:
at least one processor; and
at least one memory including computer program code,
wherein the at least one memory and the computer program code are configured to, with the at least one processor, cause the device at least to:

receive interaction information,
wherein the interaction information is related to an interaction of one or more users with one or more user input devices, and the one or more user input device's physical interaction with a plurality of physical wall surfaces and a floor surface, within a structure that provides an immersive environment, wherein the immersive environment comprises one or more virtual objects and one or more virtual environmental elements,
wherein the immersive environment is displayed on a majority of the plurality of physical wall surfaces of the structure to create the immersive environment;
process the interaction information using a machine learning model to identify one or more characteristics of the interaction information;
determine, using the machine learning model, one or more modifications to the immersive environment based on the identified one or more characteristics, wherein the machine learning model is trained based on other interaction information, and wherein the machine learning model is trained based on past characteristics of the interaction information corresponding to data related to past uses of the structure by the one or more users; and
output the determined one or more modifications to a multimedia output system, wherein the multimedia output system comprises the plurality of physical wall surfaces.

24. The device according to claim 23, wherein the one or more characteristics comprise a location of the interaction relative to the immersive environment, a speed of the interaction, an accuracy of the interaction, or success or failure of the interaction.

25. The device according to claim 23, wherein the one or more modifications are related to a size of the one or more virtual objects, a speed of the one or more virtual objects, a location of the one or more virtual objects, or a quantity of the one or more objects.

26. The device according to claim 23, wherein the multimedia output system outputs the immersive environment.

27. The device according to claim 23, wherein the interaction information is gathered by a tracking system associated with the structure.

28. The device according to claim 23, wherein the structure is connected, via a network, with one or more other structures in a same location as the structure or one or more other locations different from the structure.

* * * * *